United States Patent
Fushimi et al.

(10) Patent No.: US 8,433,595 B2
(45) Date of Patent: Apr. 30, 2013

(54) INFORMATION PROVIDING SYSTEM

(75) Inventors: Kazuo Fushimi, Tokyo (JP); Tomohisa Hamano, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 678 days.

(21) Appl. No.: 12/519,202

(22) PCT Filed: Nov. 6, 2007

(86) PCT No.: PCT/JP2007/071867
§ 371 (c)(1),
(2), (4) Date: Jun. 15, 2009

(87) PCT Pub. No.: WO2008/078464
PCT Pub. Date: Jul. 3, 2008

(65) Prior Publication Data
US 2010/0023382 A1    Jan. 28, 2010

(30) Foreign Application Priority Data
Dec. 25, 2006    (JP) .................................. 2006-347000

(51) Int. Cl.
*G06Q 40/00*    (2012.01)
(52) U.S. Cl.
USPC ........................................ 705/7.11; 705/7.42
(58) Field of Classification Search ............. 705/7, 7.11, 705/7.42
See application file for complete search history.

(56) References Cited

U.S. PATENT DOCUMENTS 6,026,375 A * 2/2000 Hall et al. ................. 705/26.43
6,317,718 B1 * 11/2001 Fano ........................... 705/14.39
6,526,335 B1    2/2003 Treyz et al.
(Continued)

FOREIGN PATENT DOCUMENTS

JP    9-153027    6/1997
JP    9-153027 A    6/1997
(Continued)

OTHER PUBLICATIONS

European Search Report dated Oct. 19, 2011 for EP Application No. 0783159.75-1238.

(Continued)

*Primary Examiner* — Thomas Dixon
*Assistant Examiner* — Benjamin S Fields
(74) *Attorney, Agent, or Firm* — Ladas & Parry LLP

(57) ABSTRACT

It is possible to accurately grasp the taste of each user and provide information in which the taste thereof is accurately reflected. Store information kept in a store information storage unit (100) is provided to each user. User taste information (T) including the values of taste on feature items of each genre is stored for each user in a user taste information storage unit (110). Store evaluation information (E) including the values of evaluation on the feature items of its genre is stored for each store in a store evaluation information storage unit (120). A store information providing unit (130) selects store information having the store evaluation information (E) matched with the user taste information (T) and provides it to the user. If the user views specific store information or utilizes a specific store, the specific store is recoded in a target store recording unit (150) as a target store. A taste value updating unit (140) updates the user taste information (T) on the basis of the store evaluation information (E) of the accumulated target store.

22 Claims, 15 Drawing Sheets

U.S. PATENT DOCUMENTS

| | | |
|---|---|---|
| 7,233,861 B2 | 6/2007 | Van Buer et al. |
| 7,565,157 B1 | 7/2009 | Ortega et al. |
| 2001/0029183 A1 | 10/2001 | Ito |
| 2002/0120943 A1* | 8/2002 | Seto et al. ............... 725/135 |
| 2002/0143490 A1 | 10/2002 | Maeda et al. |
| 2008/0147484 A1 | 6/2008 | Davis |
| 2008/0249969 A1 | 10/2008 | Tsui et al. |
| 2009/0106085 A1* | 4/2009 | Raimbeault ............... 705/10 |
| 2010/0268578 A1* | 10/2010 | Fushimi et al. .......... 705/10 |

FOREIGN PATENT DOCUMENTS

| | | |
|---|---|---|
| JP | 2000-3394 | 1/2000 |
| JP | 2000-3394 A | 1/2000 |
| JP | 2000-155757 | 6/2000 |
| JP | 2001-229285 | 8/2001 |
| JP | 2001-229285 A | 8/2001 |
| JP | 2001-290727 | 10/2001 |
| JP | 2001-290727 A | 10/2001 |
| JP | 2001-339691 A | 12/2001 |
| JP | 2002-319089 A | 10/2002 |
| JP | 2003-50135 | 2/2003 |
| JP | 2003-50135 A | 2/2003 |
| JP | 2003-196284 A | 7/2003 |
| JP | 2003-248681 | 9/2003 |
| JP | 2003-248681 A | 9/2003 |
| JP | 2004-295624 | 10/2004 |
| JP | 2004-295624 A | 10/2004 |

OTHER PUBLICATIONS espacenet English abstract of JP 2004-295624 A.
espacenet English abstract of JP 2000-3394 A.
espacenet English abstract of JP 2001-229285 A.
espacenet English abstract of JP 2003-248681 A.
espacenet English abstract of JP 2001-339691 A.
espacenet English abstract of JP 9-153027 A.
espacenet English abstract of JP 2003-50135 A.
espacenet English abstract of JP 2001-290727 A.
Office Action dated Sep. 15, 2009 from the Japanese Patent Office in respect of corresponding Japanese Application No. 2006-347000 with English translation.
espacenet English abstract of JP 2003-196284 A.
espacenet English abstract of JP 2002-319089 A.
Office Action dated Aug. 8, 2012 for EP Application No. 07 831 597.5-1238.

* cited by examiner

FIG.3

| BROAD CATEGORY | GENRE | GENRE CODE |
|---|---|---|
| MEAL | JAPANESE FOOD | G11 |
| | FRENCH FOOD | G12 |
| | ITALIAN FOOD | G13 |
| | MEXICAN FOOD | G14 |
| COFFEE SHOP | ORDINARY COFFEE SHOP | G21 |
| | JAZZ COFFEE SHOP | G22 |
| | ACCOMPANYING COFFEE SHOP | G23 |
| SHOPPING | DEPARTMENT STORE | G31 |
| | WOMEN'S CLOTHING | G32 |
| | MEN'S CLOTHING | G33 |
| | DAILY USE COMMODITIES | G34 |
| SHOW | MOVIE | G41 |
| | THEATERGOING | G42 |
| | VARIETY HALL | G43 |
| | CONCERT | G44 |
| GAME & PLAY | AMUSEMENT PARK | G51 |
| | GAME ARCADE | G52 |
| | MAHJONG PARLOR | G53 |
| | BOWLING ALLEY | G54 |
| SPORTS | BASEBALL STADIUM | G61 |
| | FOOTBALL STADIUM | G62 |
| | GOLF COURSE | G63 |
| ACCOMMODATION | HOTEL | G71 |
| | INN | G72 |
| | PENSION | G73 |
| HEALTH | SAUNA | G81 |
| | MASSAGE | G82 |
| | RELAXATION | G83 |

FIG.4

GENRE G13: ITALIAN FOOD

(a) STORE EVALUATION INFO E1301
| STORE ID | S1301 |
|---|---|
| GENRE CODE | G13 |

EVALUATION VALUES:
| FORMALITY | 95 |
|---|---|
| VOLUME | 20 |
| PRICE | 80 |

(b) STORE EVALUATION INFO E1302
| STORE ID | S1302 |
|---|---|
| GENRE CODE | G13 |

EVALUATION VALUES:
| FORMALITY | 20 |
|---|---|
| VOLUME | 83 |
| PRICE | 32 |

(c) STORE EVALUATION INFO E1303
| STORE ID | S1303 |
|---|---|
| GENRE CODE | G13 |

EVALUATION VALUES:
| FORMALITY | 53 |
|---|---|
| VOLUME | 62 |
| PRICE | 51 |

GENRE G32: WOMEN'S CLOTHING

(d) STORE EVALUATION INFO E3201
| STORE ID | S3201 |
|---|---|
| GENRE CODE | G32 |

EVALUATION VALUES:
| MODERNISM | 15 |
|---|---|
| AGE | 65 |
| PRICE | 40 |

(e) STORE EVALUATION INFO E3202
| STORE ID | S3202 |
|---|---|
| GENRE CODE | G32 |

EVALUATION VALUES:
| MODERNISM | 62 |
|---|---|
| AGE | 48 |
| PRICE | 33 |

(f) STORE EVALUATION INFO E3203
| STORE ID | S3203 |
|---|---|
| GENRE CODE | G32 |

EVALUATION VALUES:
| MODERNISM | 93 |
|---|---|
| AGE | 17 |
| PRICE | 81 |

GENRE G41: MOVIE

(g) STORE EVALUATION INFO E4101
| STORE ID | S4101 |
|---|---|
| GENRE CODE | G41 |

EVALUATION VALUES:
| SPACE | 100 |
|---|---|
| IN-HOUSE SHOPS | 92 |
| LATE NIGHT | 88 |

(h) STORE EVALUATION INFO E4102
| STORE ID | S4102 |
|---|---|
| GENRE CODE | G41 |

EVALUATION VALUES:
| SPACE | 28 |
|---|---|
| IN-HOUSE SHOPS | 0 |
| LATE NIGHT | 0 |

(i) STORE EVALUATION INFO E4103
| STORE ID | S4103 |
|---|---|
| GENRE CODE | G41 |

EVALUATION VALUES:
| SPACE | 82 |
|---|---|
| IN-HOUSE SHOPS | 56 |
| LATE NIGHT | 32 |

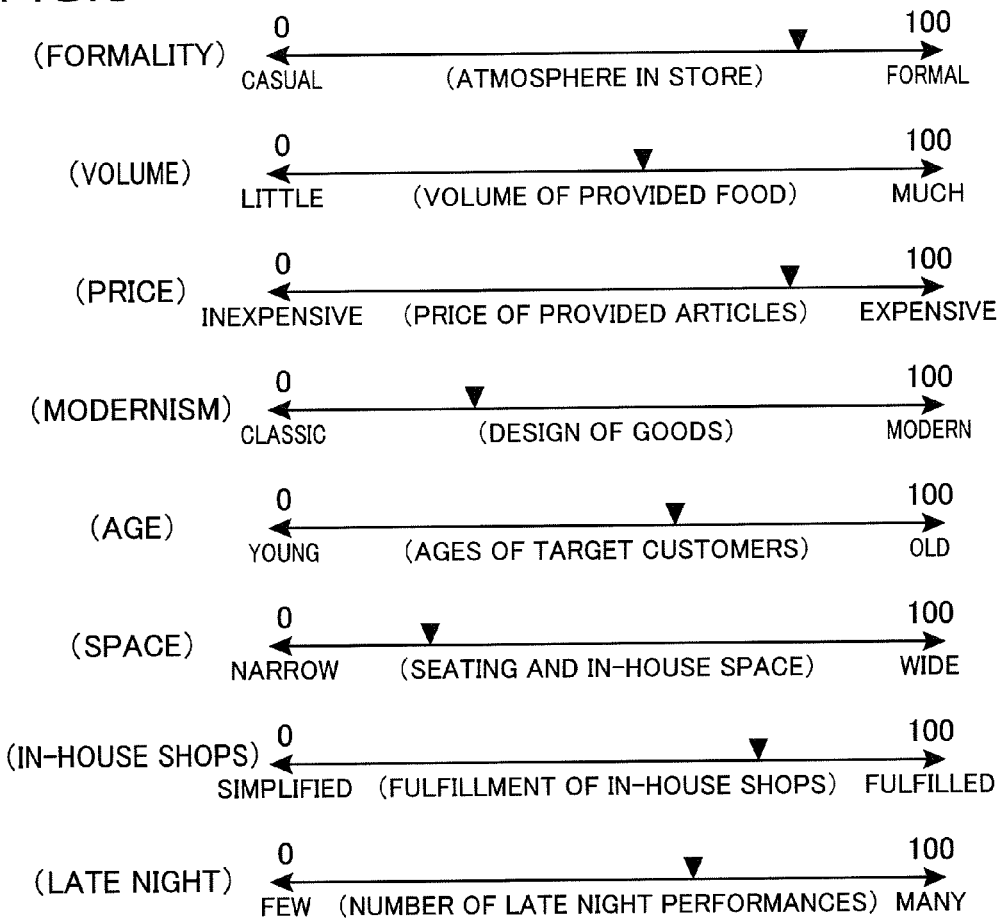

FIG.15

WELCOME, USER AAA (ACCOMPANYING PERSON: BBB )

PLEASE ENTER YOUR SATISFACTION DEGREE FOR

JUST-BOILED SPAGHETTI SHOP XYZ (SATISFACTION DEGREE)

0 ▼ 100

NOT SATISFIED (OVERALL SATISFACTION DEGREE) SATISFIED

PLEASE DECIDE YOUR SATISFACTION DEGREE BY MOVING ▼-KEY RIGHT AND LEFT, AND PRESS ENTER BUTTON. (ENTER)

FIG.16

WELCOME, USER AAA (ACCOMPANYING PERSON: BBB )

PLEASE VOTE FOR

JUST-BOILED SPAGHETTI SHOP XYZ (FORMALITY) 0 ▼ 100
CASUAL (ATMOSPHERE IN STORE) FORMAL (VOLUME) 0 ▼ 100
LITTLE (VOLUME OF PROVIDED FOOD) MUCH (PRICE) 0 ▼ 100
INEXPENSIVE (PRICE OF PROVIDED ARTICLES) EXPENSIVE (SATISFACTION DEGREE)
0 ▼ 100
NOT SATISFIED (OVERALL SATISFACTION DEGREE) SATISFIED

PLEASE DECIDE YOUR EVALUATION VALUES BY MOVING ▼-KEY RIGHT AND LEFT, AND PRESS VOTE BUTTON. (VOTE)

| PERSONAL SATISFACTION INFORMATION M1AAA ||
|---|---|
| USER ID | AAA |
| ACCOMPANYING PERSON ID | BBB |
| STORE ID | S1302 |
| GENRE CODE | G13 |
| PERSONAL SATISFACTION DEGREE | 85 |

| PERSONAL SATISFACTION INFORMATION M1BBB ||
|---|---|
| USER ID | BBB |
| ACCOMPANYING PERSON ID | AAA |
| STORE ID | S1302 |
| GENRE CODE | G13 |
| PERSONAL SATISFACTION DEGREE | 23 |

FIG.20A

| USER ID: AAA | | | | | |
|---|---|---|---|---|---|
| SUNDAY | 08/OCT/2006 | SHOW | MEAL | | |
| | 15/OCT/2006 | COFFEE SHOP | SHOW | MEAL | |
| | 22/OCT/2006 | SHOPPING | HEALTH | | |
| | 12/NOV/2006 | GAME & PLAY | SHOPPING | MEAL | HEALTH |
| | 26/NOV/2006 | SHOPPING | COFFEE SHOP | SHOW | MEAL |
| MONDAY | 09/OCT/2006 | MEAL | COFFEE SHOP | | |
| | 16/OCT/2006 | MEAL | COFFEE SHOP | | |

FIG.20B

| USER ID: BBB | | | | | |
|---|---|---|---|---|---|
| SUNDAY | 08/OCT/2006 | SHOW | COFFEE SHOP | | |
| | 22/OCT/2006 | GAME & PLAY | MEAL | | |
| | 05/NOV/2006 | MEAL | SHOW | SPORTS | |
| | 26/NOV/2006 | SHOW | COFFEE SHOP | HEALTH | |
| | 03/DEC/2006 | SHOPPING | SHOW | MEAL | COFFEE SHOP |
| MONDAY | 16/OCT/2006 | SPORTS | HEALTH | | |
| | 13/NOV/2006 | SPORTS | HEALTH | COFFEE SHOP | |

INFORMATION PROVIDING SYSTEM

TECHNICAL FIELD

The present invention relates to an information providing system, and in particular, to an information providing system capable of providing store information regarding a variety of stores by utilizing a network.

BACKGROUND ART

In recent years, the means for providing information has undergone a change from old information providing methods utilizing television and radio broadcasting systems to novel information providing methods utilizing Web pages on the Internet. In particular, based on the popularization of portable terminal devices such as a cellular phone, a user is able to access necessary information from an arbitrary location, and therefore, convenience has been greatly increased. Also, from a business side that provides commodities and services, store advertisements and guide information can be widely provided to users via Web pages. When a user goes out, the user is able to obtain a wide range of information regarding stores, which the user plans to utilize, by browsing such Web pages in advance.

Thus, when accessing information via the Internet, it is important to extract information matched with one's own requests from the great abundance of information. Therefore, the user carries out retrieval using a desired keyword by utilizing retrieval sites, and accesses a Web page on which necessary information is provided. For example, where the user goes out to have a meal out or goes out shopping, the user is able to browse Web pages of Italian food restaurants or women's clothing shops by using retrieval keywords such as "Italian food" and "Women's clothing."

In addition, in order to efficiently provide appropriate information to individual users, various types of technologies are provided. For example, Japanese Unexamined Patent Publication No. 2003-296358A discloses an information distribution system, in which information showing the tastes of individual users is collected in advance, for providing information that matches with the tastes of individuals, and Japanese Unexamined Patent Publication No. 2004-326211A discloses a manner in which the degrees of taste of respective users are stored as a profile based on situation information including an accompanying person. Further, Japanese Unexamined Patent Publication No. 2002-108918A discloses a taste learning apparatus for learning the tastes of a specified user based on the behavior history of the user.

As has been disclosed in the respective patent documents described above, several proposals have already been provided, which grasp the tastes of individual users and provides appropriate information to the individual users. However, since, in either technology described above, it is difficult to accurately grasp the taste information of individual users, it is also difficult to provide information in which the tastes of users are accurately reflected.

Accordingly, the present invention has an object to provide an information providing system that is able to accurately grasp the tastes of individual users and to provide information in which the tastes of users are accurately reflected.

DISCLOSURE OF THE INVENTION (1) The first feature of the invention resides in an information providing system, comprising:

a store information storage unit in which store information regarding individual stores is stored;

a store evaluation information storage unit in which store evaluation information for the respective stores is stored, the store evaluation information includes store IDs to specify the respective stores and evaluation values of the respective stores with respect to specified feature items defined in advance;

a user taste information storage unit in which user taste information for various users is stored, the user taste information includes user IDs to specify the respective users and taste values of the respective users with respect to the feature items;

a store information providing unit for providing store information when a provision request of store information coincident with a specified retrieval condition is received from a user, the store information providing unit selecting store information coincident with the retrieval condition and suitable for the user, by comparing "user taste information of the user stored in the user taste information storage unit" with "store evaluation information with respect to various stores which is stored in the store evaluation information storage unit", extracting the selected store information from the store information storage unit, and providing the extracted store information to a terminal device of the user;

a target store recording unit for, when a specified user has interest in a specified store, accumulating and recording, as a target store ID, a store ID of the specified store for the specified user; and a taste value updating unit for extracting, as updating store IDs, all or a part of target store IDs recorded in the target store recording unit for the specified user, extracting the store evaluation information including the updating store IDs from the store evaluation information storage unit as updating store evaluation information, and updating taste values of the user taste information for the specified user, which is stored in the user taste information storage unit, based on evaluation values of the updating store evaluation information.

(2) The second feature of the invention resides in an information providing system according to the first feature, further comprising:

a voting result recording unit for accumulating and recording a voting result when a user votes a personal evaluation value with respect to feature items of a store; and an evaluation value updating unit for extracting all or a part of the voting results recorded in the voting result recording unit for a specified store and updating evaluation values of store evaluation information for the specified store, which is stored in the store evaluation information storage unit, based on the extracted voting results.

(3) The third feature of the invention resides in an information providing system according to the first or second feature, further comprising:

a personal satisfaction information recording unit for, when a plurality of users utilize a specified store as a group, accumulating and recording personal satisfaction information including group composition information to specify users who compose the group, user IDs to specify individual users, and personal satisfaction degrees of the users; and a satisfaction degree ratio calculating unit for calculating a satisfaction degree ratio of respective users under a specified group utilization condition of "a specified group utilizes a store" based on all or a part of the personal satisfaction information recorded in the personal satisfaction information recording unit;

wherein the store information providing unit, when receiving a provision request of store information under the specified group utilization condition, extracts store information suitable for individual users pertaining to the specified group utilization condition, respectively, as candidates and selects and provides store information among the candidates in compliance with the satisfaction degree ratio under the specified group utilization condition.

(4) The fourth feature of the invention resides in an information providing system, comprising:

a store information storage unit in which store information regarding individual stores is stored;

a store evaluation information storage unit in which store evaluation information for the respective stores is stored, the store evaluation information includes store IDs to specify the respective stores, genre codes showing genres of the respective stores, and evaluation values of the respective stores with respect to specified feature items defined in advance;

a user taste information storage unit in which user taste information for various users is stored, the user taste information includes user IDs to specify the respective users, the genre codes, and taste values of the respective users with respect to the feature items corresponding to the genre codes;

a store information providing unit for providing store information when a provision request of store information coincident with a specified retrieval condition is received from a user, the store information providing unit selecting store information coincident with the retrieval condition and suitable for the user, by comparing "user taste information of the user stored in the user taste information storage unit" with "store evaluation information which is stored in the store evaluation information storage unit" both including a same genre code, extracting the selected store information from the store information storage unit, and providing the extracted store information to a terminal device of the user;

a target store recording unit for, when a specified user has interest in a specified store, accumulating and recording, as a target store ID, a store ID of the specified store for the specified user and for each individual genre; and a taste value updating unit for extracting, as updating store IDs, "target store IDs of all or a part of a predetermined genre which becomes an object to be updated" recorded in the target store recording unit for the specified user, extracting the store evaluation information including the updating store IDs from the store evaluation information storage unit as updating store evaluation information, and updating taste values of the user taste information for the specified user regarding the genre to be updated, which is stored in the user taste information storage unit, based on evaluation values of the updating store evaluation information.

(5) The fifth feature of the invention resides in an information providing system according to the fourth feature, further comprising:

a voting result recording unit for accumulating and recording a voting result for each individual store when a user votes a personal evaluation value with respect to feature items of a store; and an evaluation value updating unit for extracting all or a part of the voting results recorded in the voting result recording unit for a specified store and updating evaluation values of store evaluation information for the specified store, which is stored in the store evaluation information storage unit, based on the extracted voting results.

(6) The sixth feature of the invention resides in an information providing system according to the fourth or the fifth feature, further comprising:

a personal satisfaction information recording unit for, when a plurality of users utilize a specified store as a group, accumulating and recording personal satisfaction information including group composition information to specify users who compose the group, the genre of a store utilized by the group, user IDs to specify individual users, and personal satisfaction degrees of the users; and a satisfaction degree ratio calculating unit for calculating a satisfaction degree ratio of respective users under a specified group utilization condition of "a specified group utilizes a specified genre of store" based on the personal satisfaction information recorded in the personal satisfaction information recording unit;

wherein the store information providing unit, when receiving a provision request of store information under the specified group utilization condition, extracts store information suitable for individual users pertaining to the specified group utilization condition, respectively, as candidates and selects and provides store information among the candidates in compliance with the satisfaction degree ratio under the specified group utilization condition.

(7) The seventh feature of the invention resides in an information providing system according to the fourth to the sixth features, further comprising:

a behavior history information collecting unit for collecting behavior history information when a specified user utilizes a specified store, the behavior history information including a user ID of the specified user, a genre code of the specified store, and utilization time;

a behavior history information storage unit for storing the behavior history information thus collected; and a succeeding genre prediction unit for predicting a genre having a high possibility to be utilized subsequently after the specified user utilized a certain genre, based on the behavior history information;

wherein the store information providing unit provides additional information along with main store information responsive to a provision request from the specified user, the additional information being store information pertaining to a succeeding genre which succeeds to a genre of the main store information and is obtained by utilizing a prediction result of the succeeding genre prediction unit.

(8) The eighth feature of the invention resides in an information providing system according to the first to the seventh features, wherein the store information providing unit has a function of transmitting Web content data to terminal devices operated by users via the Internet, store information is stored in the store information storage unit as Web content data, and a content ID to specify the Web content data is utilized as the store ID.

(9) The ninth feature of the invention resides in an information providing system according to the first to the eighth features, wherein the store evaluation information storage unit stores store evaluation information including evaluation values for a plurality N of feature items, respectively, and the user taste information storage unit stores user taste information including taste values for a plurality N of feature items, respectively, wherein when the store information providing unit receives a provision request of store information from a user, the store information providing unit compares "a taste vector obtained by placing the taste values for respective N feature items included in the user taste information of the user in respective coordinate axes of an N-dimensional coordinate system" with "an evaluation vector obtained by placing the evaluation values for respective N feature items included in the store evaluation information of respective stores in respective coordinate axes of the N-dimensional coordinate system" and selects store information based on a degree of approximation of both vectors.

(10) The tenth feature of the invention resides in an information providing system according to the first to the ninth features, wherein the store information providing unit also provides evaluation values included in the store evaluation information for a store with respect to store information when providing the store information.

(11) The eleventh feature of the invention resides in an information providing system according to the first to the tenth features, wherein the store information providing unit carries out a first providing step for selecting a plurality of sets of store information coincident with a retrieval condition and suitable for a user and providing a list in which only summaries of respective selected store information is enumerated, and a second providing step for providing all the content of a set of store information of a store designated by the user on the list.

(12) The twelfth feature of the invention resides in an information providing system according to the eleventh feature, wherein when the store information providing unit executes the second providing step based on designation by a user, the target store recording unit accumulates and records a store ID of a store a set of store information of which has been provided by the second providing step, as a target store ID for the user.

(13) The thirteenth feature of the invention resides in an information providing system according to the first to the eleventh features, wherein the target store recording unit accumulates and records a store ID of a specified store as a target store ID for a user when the target store recording unit receives a report that the user has interest in the specified store or a report that the specified user has utilized the specified store.

(14) The fourteenth feature of the invention resides in an information providing system according to the first to the eleventh features, wherein the store information providing unit has a function of providing store information to a portable terminal device that a user carries, and the target store recording unit accumulates and records a store ID of a specified store as a target store ID for a user where it is detected based on information from a position recognition device having a function of recognizing a position of the portable terminal device that the user is located in the specified store.

(15) The fifteenth feature of the invention resides in an information providing system according to the first to the eleventh features, wherein the store information providing unit has a function for providing store information to a portable terminal device that a user carries, and where communications have been executed between a store installation unit installed in a predetermined store and the portable terminal device, the target store recording unit accumulates and records a store ID of the store as a target store ID for the user upon receiving a notice from the store installation unit or the portable terminal device.

(16) The sixteenth feature of the invention resides in an information providing system according to the first to the fifteenth features, wherein the target store recording unit concurrently records recording time information when it records a target store ID, and the taste value updating unit extracts only those, the recording time of which is within a predetermined period, as updating store IDs among the target store IDs recorded in the target store recording unit.

(17) The seventeenth feature of the invention resides in an information providing system according to the first to the sixteenth features, wherein the taste value updating unit carries out updating in which an average value of the evaluation values of the updating store evaluation information are made into a new taste value of user taste information.

(18) The eighteenth feature of the invention resides in an information providing system according to the second or fifth feature, wherein the voting result recording unit concurrently records recording time information when it records a voting result, and the evaluation value updating unit updates evaluation values of store evaluation information by extracting only those, the recording time of which is within a predetermined period, among the voting results recorded in the voting result recording unit.

(19) The nineteenth feature of the invention resides in an information providing system according to the second, fifth or eighteenth feature, wherein the evaluation value updating unit carries out updating in which the average values of the personal evaluation values included in the extracted voting results are made into new evaluation values of store evaluation information.

(20) The twentieth feature of the invention resides in an information providing system according to the third or sixth feature, wherein the personal satisfaction information recording unit concurrently records recording time information when it records personal satisfaction information, and the satisfaction degree ratio calculating unit calculates a satisfaction degree ratio by utilizing only those, the recording time of which is within a predetermined period, among personal satisfaction information recorded in the personal satisfaction information recording unit.

(21) The twenty-first feature of the invention resides in an information providing system according to the third, sixth or twentieth feature, wherein the satisfaction degree ratio calculating unit calculates, as a satisfaction degree ratio, a ratio of average values of personal satisfaction degrees for individual users included in the personal satisfaction information utilized for calculation.

(22) The twenty-second feature of the invention resides in an information providing system according to the third, sixth, twentieth or twenty-first feature, wherein the store information providing unit selects sets of store information among candidates of store information extracted for individual users at a probability responsive to a direct ratio of satisfaction degrees of individual users or at a probability responsive to an inverse ratio of the satisfaction degrees of individual users.

In an information providing system according to the present invention, since store evaluation information is established for individual stores, and the taste information of a user is updated based on the store evaluation information with respect to a store in which the user has interest, accurate tastes of individual users can be automatically collected while the system is being operated. Therefore, the system can accurately grasp the tastes of individual users and provide information in which the tastes of users are accurately reflected. Further, in the case of the invention according to Embodiment 2 described in Section 6, since the store evaluation information is further updated by voting of users, such an effect can be brought about, by which the store evaluation information can be kept as live information in which recent trends are reflected. On the other hand, in the case of the invention according to Embodiment 3 described in Section 7, an additional effect can be brought about by which further appropriate information can be provided with the existence of an accompanying person taken into consideration. In the case of the invention according to Embodiment 4 described in Section 8, an additional effect can be brought about by which further appropriate information can be provided by predicting the behavior of users.

BRIEF DESCRIPTION OF THE DRAWINGS

FIG. 3 is a table showing one example of genres defined in the information providing system according to the present invention.

FIG. 4 is a view showing a configurational example of store evaluation information E stored in a store evaluation information storage unit 120 of an information providing system according to Embodiment 1 shown in FIG. 1.

FIG. 5 is a schematic view showing a concept of evaluation values contained in the store evaluation information of the information providing system according to the present invention and a concept of taste values contained in user taste information thereof.

FIG. 6 is a view showing a configurational example of user taste information T stored in the user taste information storage unit 110 of the information providing system according to Embodiment 1 shown in FIG. 1.

FIG. 15 is a view showing one example of a satisfaction information enter screen presented by a personal satisfaction information recording unit 190 of the information providing system according to Embodiment 3 shown in FIG. 14.

FIG. 16 is a view showing one example of an enter screen in which the voting screen shown in FIG. 12 and a satisfaction information enter screen shown in FIG. 15 are integrated.

FIG. 20A and FIG. 20B are views each showing one example of behavior history information stored in behavior history information storage unit 220 of the information providing system according to Embodiment 4 shown in FIG. 19.

FIG. 21A and FIG. 22B are views each showing one example of a presentation pattern of additional information in the information providing system according to Embodiment 4 shown in FIG. 19.

BEST MODE FOR CARRYING OUT THE INVENTION

<<<Section 1. Basic Configuration of Embodiment 1>>>

Figure 1:
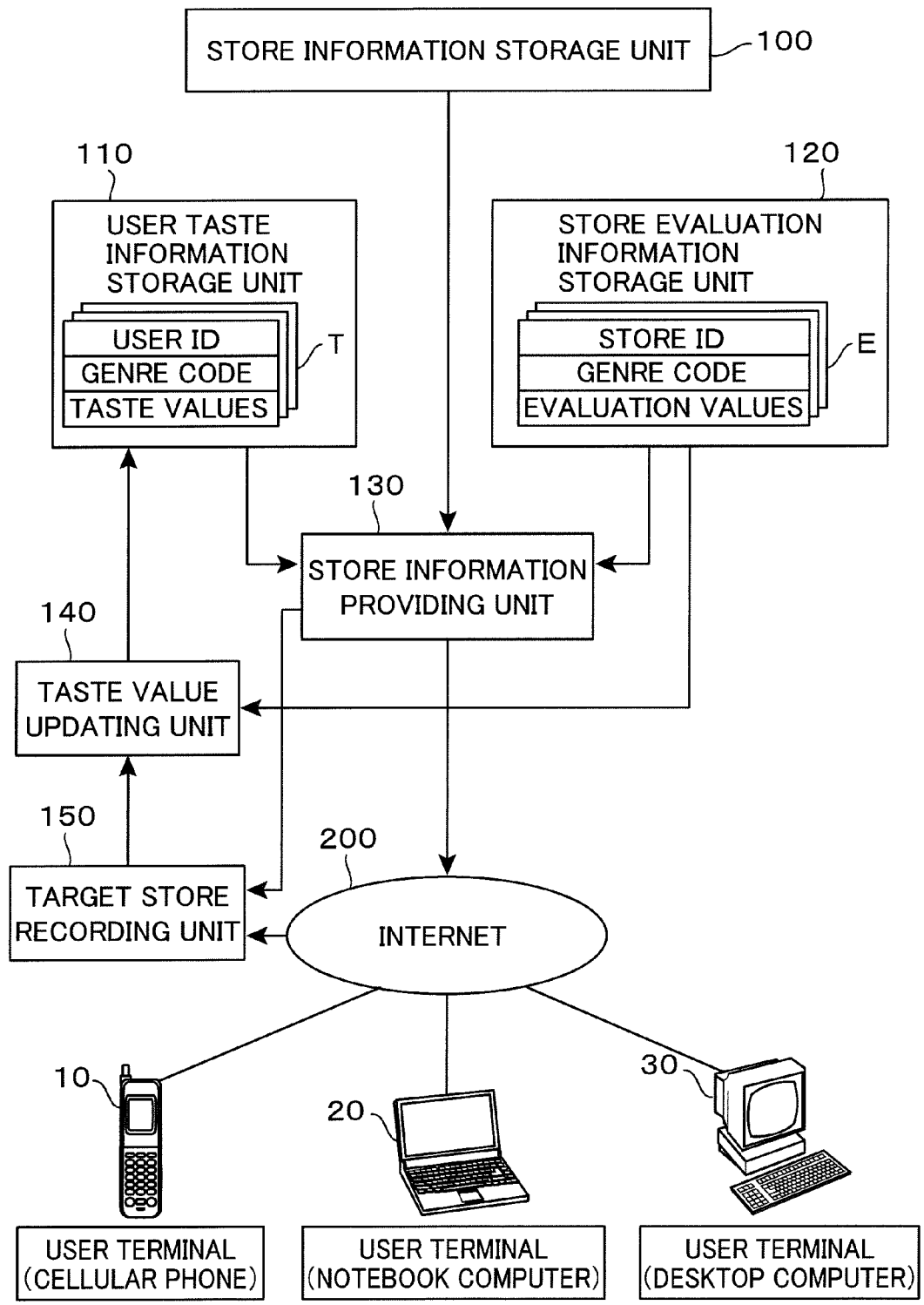
FIG. 1 is a block diagram showing a basic configuration of an information providing system according to Embodiment 1 of the present invention.

FIG. 1 is a block diagram showing a basic configuration of an information providing system according to Embodiment 1 of the present invention. Embodiment 1 is one of the most basic embodiments of the present invention, which has a function of accurately grasping tastes (or preferences) of respective users and of providing information in which the tastes of the users are accurately reflected.

As illustrated, the information providing system is composed of respective components of a store information storage unit 100, a user taste information storage unit 110, a store evaluation information storage unit 120, a store information providing unit 130, a taste value updating unit 140 and a target store recording unit 150, and has a function of providing store information prepared in the store information storage unit 100 to user terminals 10, 20 and 30 operated by users via the Internet 200. In addition, for convenience of description, the respective components are shown with independent blocks, respectively. However, in actuality, the information providing system according to the present embodiment is achieved by incorporating dedicated programs in a server computer, wherein the respective block components illustrated are composed by incorporating software to carry out respective processes described later in a CPU and a memory unit of the server computer.

The outline of operation of the system is as follows. First, the user taste information storage unit 110 stores user taste information T including taste values with respect to feature items of each genre for each user, and the store evaluation information storage unit 120 stores store evaluation information E including evaluation values with respect to feature items of the genre for each store. The store information providing unit 130 selects store information having store evaluation information E matched with the user taste information T and provides the same to a user terminal device. Also, if a user browses information of a specified store or utilizes a specified store, the specified store is accumulated in the target store recording unit 150 as a target store. The taste value updating unit 140 updates the user taste information T based on the store evaluation information E which relates to the accumulated target stores. Hereinafter, a detailed description is given of a framework for carrying out such actions.

The store information storage unit 100 has a function of storing store information regarding respective stores, respectively. Herein, the store information widely means advertisements of individual stores and guide information. In the embodiment illustrated, the store information is provided to respective user terminals 10, 20 and 30 by the store information providing unit 130 via the Internet 200. Therefore, individual store information is stored in the store information storage unit 100 as Web content data (for example, HTML format file), and the store information providing unit 130 has a function of transmitting the Web content data to the respective user terminals 10, 20 and 30 via the Internet 200. The respective user terminals 10, 20 and 30 are provided with a Web browser feature, respectively, wherein the respective users may browse the Web content data (that is, provided store information) on the display screen of the respective terminals 10, 20 and 30.

Also, in FIG. 1, such an example is shown in which the user terminal 10 is composed of a cellular phone, the user terminal 20 is composed of a notebook computer, and the user terminal 30 is composed of a desktop computer. However, the user terminal device is not limited to such terminal devices. Any type of terminal device that has a Web browser function capable of receiving and browsing Web content data may be acceptable. In addition, although only three user terminals are depicted in FIG. 1, many more user terminals may be used if the information providing system is commercially operated.

Figure 2:
FIG. 2 is a plan view showing an expression example of store information stored in a store information storage unit 100 of the information providing system shown in FIG. 1.

FIG. 2 is a plan view showing display examples of store information stored in the store information storage unit 100 of the information providing system shown in FIG. 1. As described above, in the case of the embodiment described here, respective store information is composed of Web content data, respectively, and either one of the display examples shown in FIG. 2 is a display screen of a Web page displayed by a Web browser. In a store generally referred to, there are various types of stores such as a restaurant, a coffee shop, a department store, etc. Therefore, in the case of the embodiment shown here, some genres are defined to specify the types of stores. FIG. 2(a), FIG. 2(b) and FIG. 2(c) show store information of stores (Italian food restaurants) contained in a genre regarding [Italian food], respectively, FIG. 2(d), FIG. 2(e) and FIG. 2(f) show store information of stores (Women's clothing shops) contained in a genre regarding [Women's clothing], respectively, and FIG. 2(g), FIG. 2(h) and FIG. 2(i) show store information of stores (movie theaters) contained in a genre regarding [Movie], respectively.

For example, the store information [S1301] shown in FIG. 2(a) is a Web page of an Italian restaurant called [Ristorante PAT], and the store information [S1302] shown in FIG. 2(b) is a Web page of an Italian Restaurant called [Just-Boiled Spaghetti Shop XYZ]. Herein, codes [S1301] and [S1302] are content IDs (for example, file name of HTML data) to specify the Web content data. Also, in the case of the example described here, a set of store information is information of advertisements and guides for a single store, wherein a relationship between the store information and the store makes one to one correspondence. Therefore, in the embodiment described below, it is assumed that a description is given of an example in which the content ID to specify Web content data is utilized as the store ID as it is. For example, the ID code being [S1301] is a content ID to specify Web content data to display such a Web page as shown in FIG. 2(a) and is also a store ID to specify an Italian restaurant called [Ristorante PAT].

As a matter of course, it is not necessary that the relationship between store information (Web content data) and a store makes one to one correspondence. For, example, a plurality of sets of store information may be prepared for a single store. On the contrary, a single set of store information may include advertisements and guide information of a plurality of stores. In these cases, since it is necessary that separate ID codes are used with respect to "the content IDs to specify individual store information" and to "the store IDs to specify individual stores," a specified matching table is to be prepared so as to recognize which content data corresponds to which store.

In addition, in the embodiments described here, individual genres are given a genre code, respectively. For example, indices of [Genre G13: Italian food], [Genre G32: Women's clothing] and [Genre G41: Movie] are shown in FIG. 2. This means that the code of the genre of [Italian food] is G13, the code of the genre of [Women's clothing] is G32, and the code of the genre of [Movie] is G41. For convenience of description, here, the upper two digits of the four-digit number of the content ID (store ID) is made coincident with the two-digit number of the code of the genre to which the store belongs. For example, the store information S1301 shown in FIG. 2(a) is store information to which [S1301] is given as a content ID (Store ID), and the upper two digits [13] of the four-digit number is made coincident with two digits [13] of the genre code G13.

FIG. 3 shows a table showing one example of genres defined in the information providing system according to the present invention. In this example, a hierarchical structure is adopted. First, the types of individual stores are briefly classified into the broad categories, and then, detailed genres are defined for each individual broad category. For example, genres of [Japanese food], [French food], [Italian food], and [Mexican food] are defined in the broad category [Meal], and genre codes G11, G12, G13 and G14 are determined, respectively. Similarly, genres of [Ordinary coffee shop] (only soft drink shop), [Jazz coffee shop] (soft drinks and jazz shop), and [Accompanying coffee shop] (Only couple-admitted coffee shop) are defined in the broad category [Coffee Shop], and genre codes G21, G22 and G23 are determined, respectively. As a matter of course, the genres shown in FIG. 3 are shown just as one example, matters concerning which genres are established and how the hierarchical structure is established for the genres may be optionally determined by a designer of the system.

Further, a word "store" used in the present application is used as a word that widely means a place and/or a facility where various commodities and services are provided to users. Therefore, it means not only a store in the narrowest sense of the meaning, which is called an indoor shop, but also an outdoor facility. For example, genres of [Movie], [Theatergoing], [Variety hall], and [Concert] are defined in the broad category [Show]. This means that [Movie theater], [Opera house], [Concert hall], and [Outdoor music hall], etc., are included in the "store" referred to in the present application. Similarly, [Outdoor amusement park], [Baseball stadium], [Football stadium], [Golf course], and [Swimming pool], etc., are included in the "store" referred to in the present application. Further, accommodation facilities such as [Hotel], [Inn], and [Pension], etc., are included in the "store" referred to in the present application.

Here, the store evaluation information storage unit 120 shown in FIG. 1 stores respective store evaluation information E with respect to various stores the store information of which is stored in the store information storage unit 100. The store evaluation information E is information for quantitatively evaluating various features such as features regarding the details and prices of commodities and services provided, features of places for provision, and features of store staff members with respect to individual stores. In the present invention, the store evaluation information E is composed of information including a store ID to specify a store (in the case of the embodiment described here, as described above, the content ID of the store information is used as the store ID as it is), a genre code showing the genre of the store, and evaluation values of the store with respect to specified feature items which are predetermined so as to correspond to the genre code.

FIG. 4 is a view showing a configurational example of store evaluation information E stored in the store evaluation information storage unit 120. FIG. 4($a$) through FIG. 4($i$) show examples of the store evaluation information with respect to the nine stores shown in the store information (Web pages) in FIG. 2($a$) through FIG. 2($i$). For example, the store evaluation information E1301 shown in FIG. 4($a$) is store information with respect to the store that is the [Ristorante PAT] the store information of which is described on the Web page of FIG. 2($a$), and the store evaluation information E1301 is composed of the store ID [S1301], the genre code [G13], and evaluation values of three types of feature items (formality, volume, price). The store evaluation information E1301 shows that the genre of the store specified by the store ID [S1301] is a genre (Italian food) shown with the genre code [G13], and as features of the store, an evaluation value of the formality (atmosphere of the store) is 95, an evaluation value of the volume (volume of provided food) is 20, and an evaluation value of the price (price of provided articles) is 80.

Herein, for convenience of description, it is assumed that the respective evaluation values may take a value in the range from 0 through 100, wherein if the evaluation value of a specified feature item is 100, the feature is most remarkably favorable or the degree of the feature is highest, and if the evaluation value of a specified feature item is 0, the feature is most obscure or the degree of the feature is lowest. For example, the Italian restaurant, which is the object to be evaluated, in the store evaluation information E1301 in FIG. 4($a$) is evaluated that the store has a very formal atmosphere, the volume of food provided is slightly small, and the prices are expensive. On the other hand, the Italian restaurant, which is an object to be evaluated, in the store evaluation information E1302 is [Just-Boiled Spaghetti Shop XYZ] the store information of which is described on the Web page of FIG. 2($b$). Since the store is given the evaluation values of 20 for formality, 83 for volume, and 32 for price, it is considered that the store is a very casual shop, the volume of food provided is sufficient, and the prices are comparatively inexpensive.

Although, if stores are of the same genre, it is possible to evaluate the stores with respect to the same feature items, there may be cases where, if stores are of different genres, application of the same feature items in the evaluation as they are is inappropriate. For example, if stores are in the same genre of [Italian food], it is appropriate to carry out an evaluation with respect to the feature items of formality, volume and price as shown in the example described above. However, if stores are in different genres of [Women's clothing] and [Movie], usually it is appropriate to carry out an evaluation with respect to different feature items.

Accordingly, in the embodiment described here, specified feature items are predetermined for each individual genre code. For example, since the store evaluation information shown in FIG. 4($a$), FIG. 4($b$) and FIG. 4($c$) is for stores in the genre of [Italian food], the feature items of formality, volume and price are established. Since the store evaluation information shown in FIG. 4($d$), FIG. 4($e$) and FIG. 4($f$) is for stores in the genre of [Women's clothing], feature items of modernism (design of goods handled), age (ages of target customers), and price (prices of articles provided) are established. Further, since the store evaluation information shown in FIG. 4($g$), FIG. 4($h$) and FIG. 4($i$) is for stores in the genre of [Movie], feature items of space (seating and in-house space), in-house shops (fulfillment of in-house shops), late night (number of late night performances) are established.

As a matter of course, it is a matter, which may be optionally determined by a designer of the system, which feature items are established to which genre of store. Also, the same feature items may be established for different genres (for example, in the examples shown in FIG. 4, the feature item of [Price] is established in both genres of [Italian food] and [Women's clothing]). In addition, in the examples shown in FIG. 4, although three feature items are established in either genre, a matter of how many feature items are established for individual genres, respectively, is also optionally determined by a designer of the system.

FIG. 5 is a schematic view showing a concept of evaluation values contained in the store evaluation information shown in FIG. 4. Titles of respective feature items are shown at the left side of the drawing, and numerical lines showing the evaluation values of 0 through 100 are depicted at the right side thereof. It does not matter what kinds of feature items are established in the present invention as long as they are features which can be quantitatively evaluated in any form. For example, since, items of [Price] and [Age] are inherently given as quantitative numerical values, the objective evaluation is possible. However, it is not necessary that the feature items established in the present invention are items which can be objectively evaluated. For example, the feature item of [Modernism] in FIG. 5 is an item showing the conceptual scale existing between both extreme ends of [Modern] and [Classic], wherein, if the evaluation value is 100, it means that the feature is most modern, and if the evaluation value is 0, it means that the feature is most classic. Such an evaluation inevitably becomes a subjective evaluation. However, if quantitative evaluation is possible, there is no problem even if it is a subjective evaluation.

In the system according to the present invention, respective evaluation values will be given by subjective judgment of a person. Therefore, even with respect to feature items pertaining to objective numerical values such as [Price] and [Age], the evaluation values are defined by subjective judgment of a person who makes an evaluation. As shown in FIG. 5, the evaluation values of [Price] and [Age] are expressed by a numerical value in the range from 0 through 100, and is not in direct relationship with the numerical values of detailed price and age. The evaluation standard regarding whether a specified price is expensive or inexpensive differs depending on the person who makes the evaluation. However, in the present invention, it is sufficient if a certain quantitative evaluation value can be defined. Further, with respect to [Age] shown in FIG. 5, subjective evaluation is conceptually given for whether a specified object is for [Old] or [Young]. Finally, even for the feature items directly linked to an objective numerical value such as [Price] and [Age], it is practically favorable that an evaluation value is defined as a subjective concept as in the example shown in FIG. 5.

Subsequently, a description is given of user taste information T stored in the user taste information storage unit 110 shown in FIG. 1. The user taste information T is information showing respective tastes of various users. In the case of the embodiment described here, the information includes a user ID to specify a user, a genre code, and taste values of the user for feature items corresponding to the genre code. Here, the feature items corresponding to the genre code are coincident with the feature items established with respect to the store evaluation information E. For example, in the case described above, since three feature items consisting of formality, volume and price are established with respect to the genre of [Italian food], the three feature items of formality, volume and price will be established, completely as shown above, in regard to the genre of [Italian food] in the user taste information T.

FIG. 6 is a view showing a configurational example of user taste information T stored in the user taste information storage unit 110. The information shown in FIG. 6 is the taste information of user AAA. That is, the user taste information TAAA13 shown in FIG. 6(a) shows tastes of user AAA with respect to the genre code G13 (Italian food), the user taste information TAAA32 shown in FIG. 6(b) shows tastes of user AAA with respect to the genre code G32 (women's clothing), and the user taste information TAAA41 shown in FIG. 6(c) shows tastes of user AAA with respect to the genre code G41 (movie). The taste of a user is expressed by means of a numerical value called a taste value. In the embodiment described here, the taste value may take a value in the range from 0 through 100 as in the above-described evaluation value.

As has been made clear by comparing with the store evaluation information of the same genre shown in FIG. 4, the feature items of the user taste information (FIG. 6(a)) regarding [Italian food] are formality, volume and price, which are coincident with the feature items of the user evaluation information (FIG. 4(a) through FIG. 4(c)) regarding [Italian food]. Similarly, the feature items of the user taste information (FIG. 6(b)) regarding [Women's clothing] are modernism, age and price, which are coincident with the feature items of the store evaluation information (FIG. 4(d) through FIG. 4(f)) regarding [Women's clothing]. Further, the feature items (FIG. 6(c)) of the user taste information regarding [Movie] are space, in-house shops, and late night, which are coincident with the feature items of the store evaluation information (FIG. 4(g) through FIG. 4(i)) regarding [Movie].

In fact, although the store evaluation information E shown in FIG. 4 shows evaluation values of the respective feature items with respect to individual stores, the user taste information shown in FIG. 6 shows taste values for each genre with respect to a specified individual called user AAA. Thus, the taste values included in the user taste information T are slightly different from the evaluation values included in the store evaluation information E in meaning, but they are common to each other in that both predetermined feature items show quantitative values in the range from 0 through 100. For example, the user taste information TAAA13 shown in FIG. 6(a) shows that the user has such taste in regard to the genre of [Italian food] that the user prefers a store at an almost intermediate atmosphere between formal and casual (formality: 45), prefers a store that serves an ample volume of food (volume: 78), and prefers a price that is slightly inexpensive (price: 42).

Although FIG. 6 shows user taste information with respect to three genres of user AAA, user taste information T of user AAA for other genres may be stored in the user taste information storage unit 110 as necessary. In addition, user taste information T for not only user AAA but also other users such as users BBB and CCC may be stored therein as well. As a matter of course, it is not necessary that the user taste information T for all the genres with respect to respective users is prepared, wherein it is sufficient that the user taste information T only for respective interested genres is prepared for individual users. Also, for convenience, a description is given of an example in which character strings such as AAA, BBB and CCC are used as the user IDs of users AAA, BBB and CCC. However, generally speaking, the user ID consisting of codes using numerals and the alphabet may be defined for individual users.

<<<Section 2: Store Information Providing Process According to Embodiment 1>>>

As described above, if the feature items of the store evaluation information are made identical to those of the user taste information with respect to the same genre, a process for comparing the taste values with the evaluation values for the same feature items can be carried out. The store information providing unit 130 shown in FIG. 1 has a function of selecting and providing store information matched with the tastes of individual users by carrying out such a comparing process. That is, when a user makes a request for providing store information matched with a specified retrieval condition, the store information providing unit 130 compares the "user taste information T of the user, which is stored in the user taste information storage unit 110," with the "store evaluation information E with respect to various stores, which is stored in the store evaluation information storage unit 120" with respect to the feature items including the same genre code. And, as a result, the store information providing unit 130 selects the store information that is coincident with the given retrieval condition and is suitable for the user, extracts the selected store information from the store information storage unit 100, and carries out a process for providing the same to the terminal device of the user.

The basic retrieval function executed by the store information providing unit 130 is the same as the function of a general search engine used in the Web page retrieval site. For example, if a user enters a specified keyword as a retrieval condition, the store information pertaining to the keyword will be retrieved from the store information (content data for Web page) stored in the store information storage unit 100. In order to enable such a retrieval process, such an operation may be carried out in advance that the retrieval keywords are picked up and preserved from the content with respect to individual store information stored in the store information storage unit 100. Since the function of such a general search engine is an art that has been publicly known, the detailed description thereof is omitted herein.

In the embodiment described here, where a user gives a request for providing desired store information to the store information providing unit 130, the user enters a retrieval keyword after logging in by entering the user ID. Therefore, when the store information providing unit 130 receives a request for providing store information from the user, the store information providing unit 130 can specify the user and can select the store information that is coincident with the given retrieval condition and is suitable for the user.

Figure 7:
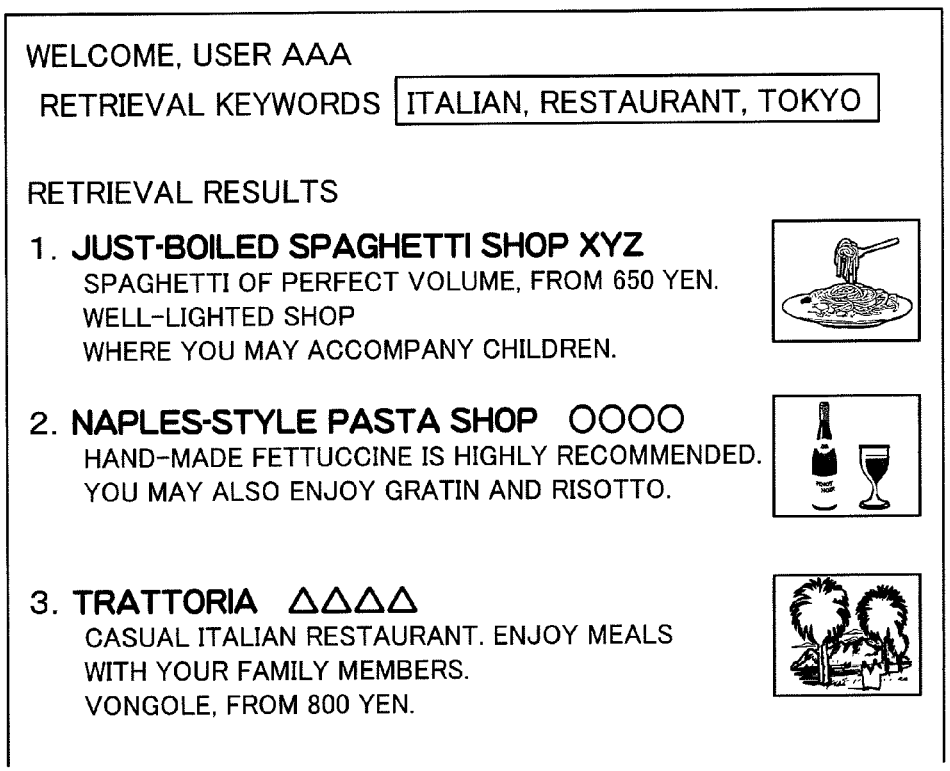
FIG. 7 is a view showing one example of a summary list of store information selected by a selection process of store information in a store information providing unit 130 of the information providing system according to Embodiment 1 shown in FIG. 1.

FIG. 7 is a view showing one example of a summary list of store information presented by the store information providing unit 130 when user AAA makes a request for providing store information by entering [Italian], [Restaurant] and [Tokyo] as retrieval keywords after logging in the store information providing unit 130. When user AAA enters keywords of [Italian], [Restaurant] and [Tokyo], the store information providing unit 130 first retrieves store information (content data), which hits the keywords, by the function of a general search engine. Then the store information providing unit 130 reads the store evaluation information E corresponding to individual store information obtained as the retrieval results from the store evaluation information storage unit 120 and subsequently reads the user taste information T of the same genre with respect to user AAA from the user taste information storage unit 110. Then, the store information providing unit 130 compares both with each other and makes a selection.

The display example shown in FIG. 7 is a summary list of store information thus selected. Items described in the summary list are only parts (summary portion) of the content of the respective store information. However, when user AAA who browses the summary list clicks the portion of a store in which the user has interest, the full text of the original store information will be displayed. For example, if user AAA clicks the title portion of [1. Just-Boiled Spaghetti Shop XYZ] displayed on the first line of the list, the screen shifts to the original Web page as shown in FIG. 2(*b*). Thus, the technology for thus presenting a summary list as the retrieval result, and for displaying the original store information of the store as Web pages where a user specifies one store in the list is an art that has been publicly known. Therefore, the detailed description thereof is omitted here.

Here, a case is taken into consideration where store information S1301, S1302 and S1303 shown in FIG. 2(*a*), FIG. 2(*b*) and FIG. 2(*c*) are hit and extracted by the function of a general search engine with respect to the keywords of [Italian], [Restaurant] and [Tokyo]. In this case, the store information providing unit 130 first reads the store evaluation information E1301, E1302 and E1303 (FIG. 4(*a*), FIG. 4(*b*) and FIG. 4(*c*)) corresponding to the respective stores described above from the store evaluation information storage unit 120. Since the genre code in the store evaluation information is G13 (Italian food), the store information providing unit 130 reads the user taste information TAAA13 (FIG. 6(*a*)) having the same user ID: AAA as that of the user who carried out retrieval and having the same genre code: G13 from the user taste information storage unit 110. Then, the store information providing unit 130 compares both with each other and selects whether each of the store information S1301, S1302 and S1303 is suitable for user AAA.

According to the user taste information TAAA13 shown in FIG. 6(*a*), it is recognized that user AAA has taste values, which are 45 for formality, 78 for volume and 42 for price with respect to the genre of [Italian food]. Therefore, the store information providing unit 130 selects one, which has evaluation values closest to the above described taste values, from the respective store evaluation information E1301, E1302 and E1303 shown in FIG. 4(*a*), FIG. 4(*b*) and FIG. 4(*c*), and carries out a process for causing the store information corresponding to the selected store evaluation information to be included in the summary list. The summary of the store information of [1. Just-Boiled Spaghetti Shop XYZ] displayed on the first line of the list of FIG. 7 is thus selected.

When the store information S3202 (Store information of the genre of [Women's clothing]) shown in FIG. 2(*e*) happens to be hit and extracted by any reason with respect to the keywords of [Italian], [Restaurant] and [Tokyo], the store evaluation information corresponding thereto will be the store evaluation information E3202 shown in FIG. 4(*e*). Therefore, the respective evaluation values of the store evaluation information E3202 are compared with the taste values of the user taste information TAAA32 (FIG. 6(*b*)) pertaining to the same genre. In the case where the user taste information pertaining to the same genre is not prepared, no comparison of the taste values with the evaluation values can be carried out. Where no comparison can be carried out like this, the store information is handled as disqualified, and may be devised not to be selected as an object to be provided to the user, on the other hand, may be selected as store information of a new genre as an object to be provided to the user.

As described above, the store information providing unit 130 will carry out a process for selecting a number of sets of store information stored in the store information storage unit 100 by using two types of sieves (screens) and a process for placing the finally selected store information in the summary list and presenting the same. Here, the first sieve is the retrieval condition entered by the user (in the above-described example, the keywords), and the second sieve is a comparison of the user taste information T with the store evaluation information E. Since only particular store information which passes through the two types of sieves is provided to the user, it becomes possible to provide information in which the tastes of the user are reflected.

The reference of selection by the second sieve will be a similarity between the user taste information T and the store evaluation information E, which become objects to be compared, that is, a degree of similarity between the taste values and evaluation values of individual feature items that become objects to be compared. In the case of the embodiment described here, taste vectors defined by respective taste values and evaluation vectors defined by the respective evaluation values are defined, wherein selection using the second sieve is carried out based on the degree of approximation between both. A detailed example thereof is shown below.

Now, a case is considered where three sets of store information S1301, S1302 and S1303 shown in FIG. 2(*a*), FIG. 2(*b*) and FIG. 2(*c*) are selected by the first sieve (for example, entry of keywords of [Italian], [Restaurant], and [Tokyo]). The second sieve is a process for selecting only store information suitable for the user from the three sets of store information. In detail, it is a process to compare the user taste information TAAA13 shown in FIG. 6(*a*) with three sets of store evaluation information E1301, E1302 and E1303 shown in FIG. 4(*a*), FIG. 4(*b*) and FIG. 4(*c*) (those of the same genre code will be compared with each other). The comparison is carried out in the vector space shown in FIG. 8. The vector space is three-dimensional coordinate space in which three types of feature items of formality, volume and price defined with respect to the genre of [Italian restaurant] are taken as respective coordinate axes. As illustrated, values 0 through 100 in the establishment range of the evaluation values or the taste values are defined at the respective coordinate axes.

Both of the user taste information T and the store evaluation information E may be defined as vectors in the vector space. For example, the user taste information TAAA13 shown in FIG. 6(*a*) may be defined as a taste vector Vt0 directed from origin O to the point T0 shown with the coordinate values (45, 78, 42), the store evaluation information E1301 shown in FIG. 4(*a*) may be defined as an evaluation vector Ve1 directed from origin O to the point E1 shown with the coordinate values (95, 20, 80), the store evaluation information E1302 shown in FIG. 4(*b*) may be defined as an evaluation vector Ve2 directed from origin O to the point E2 shown with the coordinate values (20, 83, 32), and the store evaluation information E1303 shown in FIG. 4(c) may be defined as an evaluation vector Ve3 directed from origin O to the point E3 shown with the coordinate values (53, 62, 51).

The degree of approximation of two vectors may be defined by the Euclidean distance between the distal end points of both the vectors in the coordinate space. For example, the degree of approximation between the taste vector Vt0 and the evaluation vector Ve1 is shown by the distance between two points T0 and E1. The shorter the distance is, the higher the degree of approximation becomes. Selection using the second sieve may be carried out based on the degree of approximation (distance between the distal end points) between the taste vector of a user and the evaluation vector of individual stores. The selection reference may be established by various methods. For example, if such a reference is established that "only the store information pertaining to a store the distance between the distal end points of which is a predetermined value α or less (the degree of approximation is a predetermined level or more) is selected as an object to be presented," selection is carried out based on the absolute reference of whether a specified store has evaluation values close to the taste values of a user. On the other hand, if such a reference is established that "stores are sorted in the order of shorter distance between the distal end points, and only the store information pertaining to the stores existing in the quantity m from the upper side is selected as an object to be presented," selection is carried out based on a relative reference by which the store information of stores existing in the quantity m is selected, in the order of higher approximation degree, from various store information passed through the first sieve.

Figure 8:
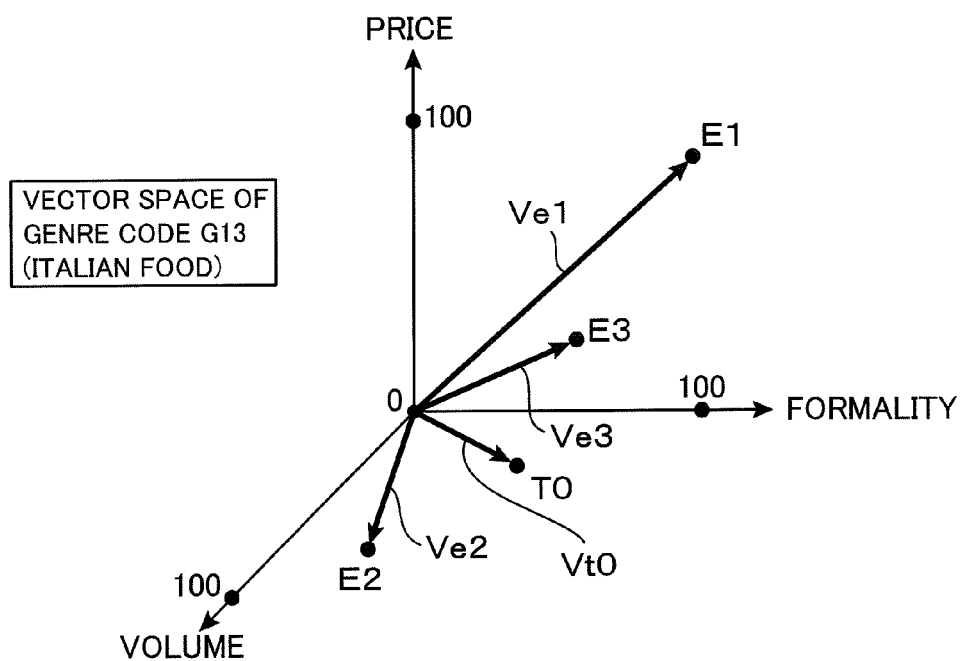
FIG. 8 is a perspective view of vector space used for a selection process of store information in the store information providing unit 130 of the information providing system according to Embodiment 1 shown in FIG. 1.

Thus, where three feature items exist, vector comparison is carried out in a three-dimensional coordinate space as shown in FIG. 8. However, where four feature items exist, vector comparison may be carried out in a four-dimensional coordinate space. Similarly, where store evaluation information E including evaluation values with respect to a plurality (N) of feature items is stored in the store evaluation information storage unit 120, respectively, and user taste information T including taste values with respect to a plurality (N) of feature items is stored in the user taste information storage unit 110, respectively, the selection using the second sieve may be carried out as follows when the above cases are extended to a general theory. That is, when the store information providing unit 130 receives a request for providing store information from a user, "a taste vector obtained by placing the taste values for respective N feature items included in the user taste information T of the user in respective coordinate axes of an N-dimensional coordinate system" is compared with "an evaluation vector obtained by placing the evaluation values for respective N feature items included in the store evaluation information E of respective stores, which passed through the first sieve, in respective coordinate axes of the N-dimensional coordinate system," and selection of the store information may be carried out based on the degree of approximation (the distance between the distal end points) of both the vectors.

Also, when presenting a plurality of sets of store information thus passed through the second sieve as a summary list as shown in FIG. 7, it is favorable that the plurality of sets of store information is sorted in the order of higher approximation degree of vectors (in the order of shorter distance between the distal end points) and is presented. This is because there is a tendency for a user, who receives presentation of the list as shown in FIG. 7, usually to select an item located at the upper rank of the list with priority and to click the same. If the store information is presented after having been sorted in the order of higher approximation degree, the probability for the item having a higher degree of approximation to be selected is increased.

<<<Section 3. Updating Process of Embodiment 1>>>

Now, in Section 1 and Section 2, a description was given of the basic functions of the store information storage unit 100, the user taste information storage unit 110, the store evaluation information storage unit 120 and the store information providing unit 130, and it was stated that, based on these functions, it was possible to provide information in which the tastes of the user are reflected. However, in order to accurately grasp the tastes of a user and to provide information in which the tastes of the user are accurately reflected, the above-described components only are not sufficient. The reason why is that it is actually difficult to prepare the user taste information T, in which the tastes of individual users are accurately grasped, in the user taste information storage unit 110. As a matter of course, although such an operation has been conventionally carried out in which users enter information of items, in which the users have a taste and interest, based on investigations through questionnaires on Web pages, with such investigations it is difficult to collect detailed taste information of users as shown in Section 1.

For example, FIG. 6 schematically shows user taste information with respect to three genres of user AAA. In this example, since three feature items are established for respective genres, it is necessary to establish predetermined taste values, which are placed in the range from 0 through 100, in connection with nine feature items in total in order to prepare user taste information for the three genres. Where there are further more feature items for respective genres and where it is necessary to prepare taste information for each of a number of genres, the number of taste values to be established will be further increased. Furthermore, since the taste values of respective users are information that can be known by only individual users themselves, it is necessary for individual users to enter the taste values in order to prepare user taste information T in the user taste information storage unit 110. It is not realistic to cause users to carry out such troublesome entry tasks as questionnaires. In addition, since the tastes of users change from time to time, it is necessary to frequently correct the taste values in order to accurately grasp the tastes of users at respective points in time. It is remarkably difficult to cause individual ordinary users to carry out such labor.

An important feature of an information providing system according to the present invention is the point that the system is provided with a framework for automatically updating the user taste information T of respective users, which is stored in the user taste information storage unit 110. The taste value updating unit 140 and the target store recording unit 150, which are shown in FIG. 1, are components to achieve the framework.

When a user has interest in a specified store, the target store recording unit 150 carries out a process for accumulating and recording the store ID of the specified store as a target store ID for individual users. Although a detailed method for recognizing a fact that "a user has interest in a specified store" will be described later, the store ID of the store will be accumulated and recorded in the target store recording unit 150 each time users have interest in specified stores. In the case of the embodiment described here, as described above, since the content ID to specify store information (Web content data) is utilized as a store ID as it is, the content ID will be accumulated and recorded in the target store recording unit 150 as a store ID.

Figure 9:
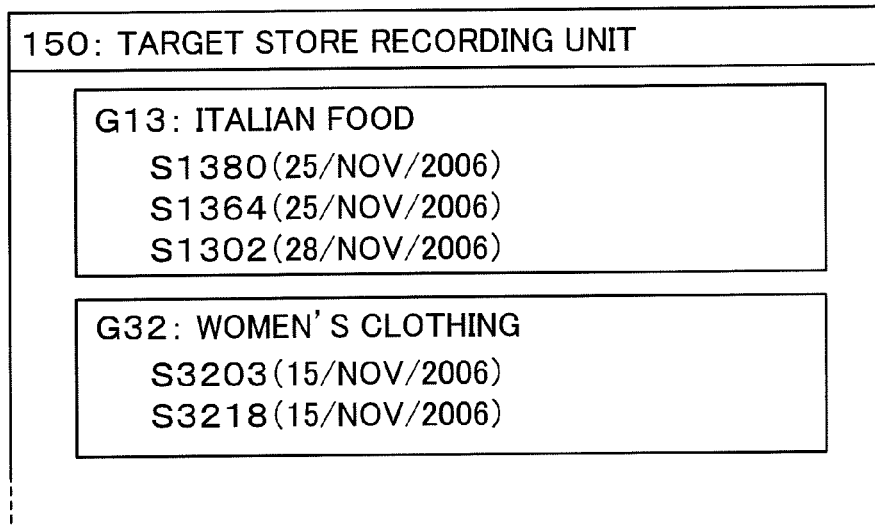
FIG. 9 is a view showing one example of target store IDs recorded in a target store recording unit 150 of the information providing system according to Embodiment 1 shown in FIG. 1.

FIG. 9 is a view showing one example of a target store ID recorded in the target store recording unit 150. The example illustrated shows a recording detail of a specified user (for example, user AAA), and such recording will be carried out for each individual user in the target store recording unit 150. In addition, in the example illustrated, the target store IDs are recorded for each individual genre. Further, the recording time information is also recorded when recording the target store IDs. In detail, FIG. 9 shows an example in which target store IDs are recorded along with the time information thereof for genre of [G13: Italian food] and genre of [G32: Women's clothing], respectively. For example, recording detail [S1380 (25/Nov/2006)] for the genre of [G13: Italian food] shows the fact that store ID [S1380] (Content ID) was recorded as a target store ID on Nov. 25, 2006. This means that the user had interest in the store corresponding to the store ID [S1380] on Nov. 25, 2006. Also, in the present application, "user had interest in a store" means not only a case where the user had direct interest in the store but also a case where the user had indirect interest in the store by having interest in Web content of the store.

In case that such recording as shown in FIG. 9 was obtained in the target store recording unit 150, the user had interest in stores specified by the target store IDs of [S1380], [S1364] and [S1302] with respect to the genre of [G13: Italian food] and had interest in stores specified by the target store IDs of [S3203] and [S3218] with respect to the genre of [G32: Women's clothing].

The taste value updating unit 140 carries out a process for updating the user taste information T in the user taste information storage unit 110 based on the information accumulated and recorded in the target store recording unit 150. That is, the taste value updating unit 140 extracts "target store IDs of a predetermined genre being an object to be updated" recorded in the target store recording unit 150 for individual users as updating store IDs, and extracts "store evaluation information E including the updating store IDs" from the store evaluation information storage unit 120 as updating store evaluation information. Then the taste value updating unit 140 updates taste values of the user taste information T regarding the predetermined genre being an object to be updated for the user, which is stored in the user taste information storage unit 110, based on evaluation values of the updating store evaluation information.

Figure 10:
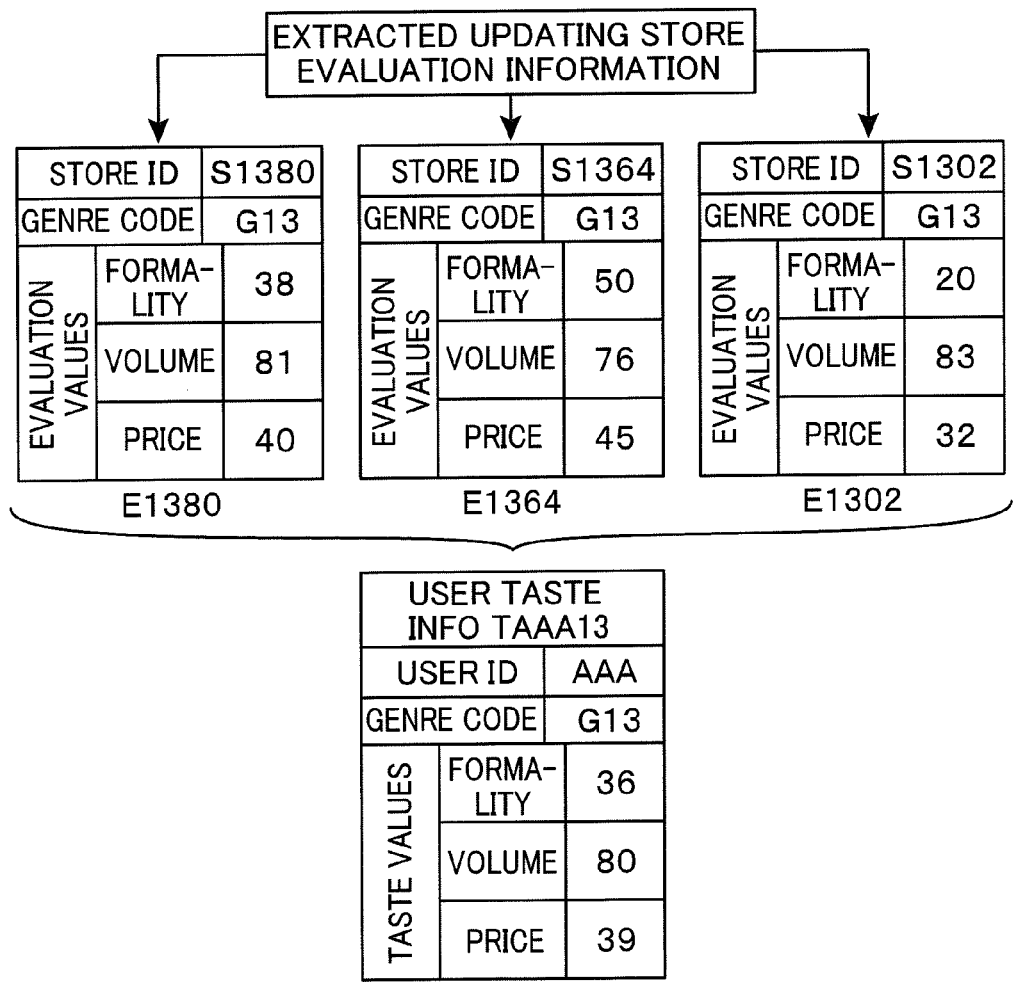
FIG. 10 is a view showing one example of updating store evaluation information, which is extracted by a taste value updating unit 140 of the information providing system according to Embodiment 1 shown in FIG. 1.

A description is given of the process based on the detailed example shown in FIG. 9. Herein, a case is considered where the target store IDs recorded in the target store recording unit 150 shown in FIG. 9 are accumulated and recorded for user AAA, and an updating process is carried out when the genre of [G13: Italian food] of user AAA is made into an object to be updated. The taste value updating unit 140 first extracts "target store IDs of a predetermined genre that becomes an object to be updated," which are recorded in the target store recording unit 150, as updating store IDs. That is, since the object to be updated in this case is the genre of [G13: Italian food], the store IDs [S1380], [S1364] and [S1302] are extracted from the target store recording unit 150 shown in FIG. 9 as the updating store IDs. Subsequently, the sets of store evaluation information [E1380], [E1364] and [E1302] including the updating store IDs [S1380], [S1364] and [S1302] are extracted from the store evaluation information storage unit 120 as updating store evaluation information. The upper stage of FIG. 10 shows one example of the updating store evaluation information thus extracted. Finally, the taste values of the user taste information TAAA13 regarding the genre of [G13: Italian food], which becomes an object to be updated with respect to user AAA, stored in the user taste information storage unit 110 are updated based on the evaluation values of the updating store evaluation information thus extracted. The lower stage of FIG. 10 shows one example of the user taste information TAAA13 thus updated.

The user taste information TAAA13 obtained by such an updating process becomes that in which the tastes of user AAA have been sufficiently reflected. The sets of store evaluation information [E1380], [E1364] and [E1302] shown on the upper stage of FIG. 10 show the evaluation values of respective feature items regarding the stores in which user AAA has interest. Therefore, it is assumed that the taste values of user AAA regarding the respective feature items are approximate to the evaluation values of the respective feature items of these stores. Accordingly, the taste value updating unit 140 carries out a process for determining a new taste value for respective feature items of the user taste information TAAA13 based on the sets of the updating store evaluation information [E1380], [E1364] and [E1302].

In the embodiment described herein, an updating process is carried out in which an average value of the evaluation values for a particular feature item of the updating store evaluation information [E1380], [E1364] and [E1302] becomes a new taste value for the particular feature item of the user taste information TAAA13. For example, a new taste value 36 of the particular feature item [Formality] of the user taste information TAAA13 shown at the lower stage of FIG. 10 is a value obtained as an average value of the respective evaluation values 38, 50 and 20 of the [Formality] of the updating store evaluation information [E1380], [E1364] and [E1302] shown at the upper stage of FIG. 10.

When carrying out the updating process described above, "a part of the target store IDs of a predetermined genre that becomes an object to be updated" recorded in the target store recording unit 150 may be extracted instead of extracting "all of the target store IDs of a predetermined genre that becomes an object to be updated." In particular, in the case of the embodiment described here, as described above, the target store recording unit 150 records the recording time information showing a time when a target store ID is recorded. Therefore, the taste value updating unit 140 may extract only those a recording time of which is within a predetermined period among the target store IDs recorded in the target store recording unit 150 as the updating store IDs.

For example, if it is devised that only the target store IDs recorded within the last three months on the basis of the present time are extracted as the updating store IDs, updating will be enabled with reference to only the evaluation values of the stores of interest for the most recent three months. Generally, it is not unusual that user tastes change from time to time. Although the target store IDs will be accumulated sequentially in the target store recording unit 150, there is a possibility that the target store ID recorded one year ago is no longer the object in which a user has interest. As in the example described above, if it is devised that only the target store IDs recorded within the last three months are extracted as updating store IDs, it becomes possible to update the user taste information in which recent new tastes are reflected. As a matter of course, in this case, it does not matter that the target store IDs recorded the previous three months may be deleted sequentially.

In addition, utilizing the recording time of the target store IDs, it is possible to obtain a weighted average value. Although, in the example shown in FIG. 10, updating is carried out by obtaining a simple average value of the respective evaluation values and making it a new taste values, a weighted average value may be calculated by placing greater weight on the evaluation values with respect to more recently recorded target store IDs, for example, and the weighted average value may be used as a new taste value to carry out updating. Therefore, it is possible to obtain the user taste information in which weight is placed on more recent tastes.

<<<Section 4. Interest Recognition Process>>>

Subsequently, a description is given of some of the detailed methods for the target store recording unit 150 to recognize the fact that "a user had interest in a specified store." As has been described in Section 2, the store information providing unit 130 presents a summary list of store information as shown in, for example, FIG. 7 to a user terminal. When the user, who browses the summary list, clicks a particular store portion in which the user has interest, the full text of the original store information is displayed. For example, if the title portion of [1. Just-Boiled Spaghetti Shop XYZ] in FIG. 7 is clicked, the screen is shifted to the original Web page as shown in FIG. 2(b).

The above-described process executed by the store information providing unit 130 is composed of two-stepped processes of "the first step of selecting a plurality of sets of store information matched with the retrieval conditions and suitable for the user and providing a list in which only the summaries of the selected store information are listed" and "the second step of providing the entire content of the store information pertaining to a store designated by the user from the list." Here, it is important that shifting to the second providing step is carried out only based on an designating operation (clicking operation) by a user.

For example, where the title portion of [1. Just-Boiled Spaghetti Shop XYZ] in FIG. 7 is clicked by a user, this means that the user shows interest in the store. In this case, it is presumed that the user had interest in the store with reference to the features of [Perfect Volume], [from 650 Yen] and [Well-lighted shop where you may easily accompany children] described in the explanation of [Just-Boiled Spaghetti Shop XYZ] in the summary list. Therefore, when the second providing step is thus executed by the store information providing unit 130 based on the designation by the user, it makes sense if the store ID of the store whose store information has been provided by the second providing step is accumulated and recorded as the target store ID with respect to the user. In order to do so, when the store information providing unit 130 carries out the second providing step, it may transmit the store ID (in the case of this embodiment, content ID) of the store designated by the user to the target store recording unit 150.

Another method for recognizing "interest by a user" is to make the user report by himself/herself on his/her interest in a specified store. For example, if a user encounters a Web page in which the user is interested when the user is browsing Web pages (store information) of various stores, which are provided by the store information providing unit 130, using a terminal device, the user may report it to the store information providing unit 130 by a certain method that the user is interested in the Web page now being browsed. For example, it may be devised that, when the store information providing unit 130 provides Web content data of various stores to a user terminal, the store information providing unit 130 transmits data to display a Web page including an "Interest" button, and, when the user clicks the "Interest" button, the store information providing unit 130 handles it to have received a report showing interest. When clicking of the "Interest" button is detected, the store information providing unit 130 transmits a store ID pertaining to the Web page, which the user is browsing, to the target store recording unit 150 so that the store ID is recorded in the target store recording unit 150 as a target store ID.

As a matter of course, the "interest by a user" is not shown only by browsing the Web page by the user. For example, when a user actually utilized a specified store (for example, when the user went out and had a meal at a specified restaurant), it is possible to recognize that the user has interest in the store if the user voluntarily gives a report to the system. In this case, a store ID of the reported store is recorded in the target store recording unit 150. In practical, when the store information providing unit 130 provides the Web content data of respective stores to a user terminal as Web pages, it is sufficient that the specified Web page is devised to be able to be recorded in the store information providing unit 130 by operation of the user. If so, when a user finds a store that he/she wants to utilize while browsing Web pages of various stores, it is possible to carry out operation of registering the Web page of the store. And, when the user actually utilized the store, the user calls the registered Web page, and executes a report of actually having utilized the store on the Web page. If the store ID pertaining to the Web page is transmitted to the target store recording unit 150 when such a report is received, the store ID may be recorded in the target store recording unit 150 as a target store ID.

Alternatively, where a user carries a portable terminal device (for example, a cellular phone) and the store information providing unit 130 provides store information to the portable terminal device, it becomes possible to judge it by detecting a position of the portable terminal device that a specified store has been utilized. That is, a position recognition device having a function of recognizing a position of the portable terminal device is prepared, and information of the recognized position is transmitted from the position recognition device to the target store recording unit 150. Since the target store recording unit 150 can recognize the fact that the user has visited a location of a specified store based on the transmitted position information, it judges that the user has utilized the store, and accumulates and records the store ID of the store as the target store ID.

For example, where a user carries a portable terminal device having a GPS function, the portable terminal device can recognize its own position (for example, information on latitude and longitude) by making use of the GPS function. Therefore, the portable terminal device is devised to report the own position information to the target store recording unit 150 at a predetermined cycle or at predetermined timing. On the other hand, the position information (for example, information on latitude and longitude) of individual stores is stored in the target store recording unit 150. If so, when the position information reported from the portable terminal device is coincident with the position information of a specified store, the target store recording unit 150 may judge that a user carrying the portable terminal device has utilized the store, wherein the store ID of the store can be accumulated and recorded as the target store ID. Further, in order to more accurately judge, the system may be devised so that it is judged that the user has utilized the store only when the user has stayed at the position of the store for a predetermined duration of time or more (for example, in the case of a restaurant, time necessary to have a meal).

Also, where the store has a large area like an amusement park, such judgment is enabled that the user has utilized the store (amusement park) even if the position information is based on considerably low accuracy. Thus, even if a position recognition device having high accuracy like GPS is not used, similar judgment is enabled. For example, a cellular phone communicates with a base station at a predetermined cycle. Therefore, if the system is devised so as to be given from a base station a report of the fact that "communication with a cellular phone which a specified user carries has been made," it is possible to recognize a present position of the specified user with an accuracy in accordance with the installation density of base stations. Therefore, with respect to a store having a wide lot like an amusement park, it is possible to recognize that the store has been utilized.

As still another approach, there is a method suitable for a situation where communications have been executed between a store installation unit installed in a predetermined store and a portable terminal device which a user carries. In this method, the target store recording unit 150 judges that the user has utilized the store upon receiving a notice from the store installation unit or the portable terminal device and a store ID of the store is accumulated and recorded as a target store ID.

In detail, most stores are provided with a payment processing unit (for example, a charging processing unit for credit cards or prepaid cards) for payment processing of price remuneration for utilization of a store. In recent years, a technology has been brought into practical use which allows a portable terminal device such as a cellular phone to have a credit card function or a prepaid card function, wherein a user carries out payment processing by making wireless communications between a portable terminal device, which the user carries, and a payment processing unit installed in a store. When the user executes payment processing by such a method, the fact that communications have been made between a portable terminal device which the user carries and a payment processing unit installed in a store is caused to be reported from the portable terminal device or the payment processing unit to the target store recording unit 150. Therefore, since the target store recording unit 150 can grasp the fact of which user has utilized which store, a store ID of the store can be accumulated and collected as a target store ID.

Further, a store installation unit having a function of communicating with a portable terminal device which a user carries is not limited to the above-described payment processing unit. For example, a portable terminal device such as a cellular phone is utilized as a pass for passing through an entrance gate of an amusement park and a movie theater. In this case, a gate management apparatus that makes wireless communications with a portable terminal device which a user carries is installed at an entrance gate. Therefore, when a user enters a store passing through the entrance gate where such a gate management apparatus is installed, the fact that communications have been made between the portable terminal device which the user carries and the gate management apparatus installed in the store is caused to be reported from the portable terminal device or the gate management apparatus to the target store recording unit 150. If so, since the target store recording unit 150 can grasp the fact of which user has utilized which store, a store ID of the store can be accumulated and recorded as a target store ID.

<<<Section 5. Operation Procedure of Embodiment 1>>>

Up to now, the functions of respective components of an information providing system according to Embodiment 1 shown in FIG. 1 have been individually explained. Here, a description is given below of the operation procedure of the entirety of the system.

To actuate the system, it is necessary to prepare store information (in the case of this embodiment, Web content data to present Web pages) for individual stores in the store information storage unit 100. In fact, however, since it is not necessary that the store information storage unit 100 is exclusive to the present system, from a practical standpoint, the existing Web server may be diverted as it is. That is, at present, most stores establish sites of Web pages by using their independent Web servers. Since the store information storage unit 100 shown in FIG. 1 may use aggregates of the existing Web servers to provide these sites as they are, it is not necessary to install a new Web server to construct the present system.

On the other hand, the user taste information storage unit 110 and the store evaluation information storage unit 120 are components inherent to the present system. These are required to be newly installed to construct the present system. As has been described in Section 1, it is necessary that user taste information T is stored in the user taste information storage unit 110 with respect to individual users and individual genres, and that store evaluation information E is stored in the store evaluation information storage unit 120 with respect to individual stores (in the case of the embodiment described here, for individual Web content).

As has been described in Section 3, the user taste information T in the user taste information storage unit 110 is automatically updated by the taste value updating unit 140 while the present system is in operation. However, at the beginning stage of the operation, it is necessary to prepare some of user taste information T. Therefore, some default values are defined as taste values of all the feature items with respect to all users and all genres, and the user taste information T in which the default values are defined is stored in the user taste information storage unit 110. For example, if taste value=50 (the intermediate value of numerical range of the taste values) is defined as the default value, the taste values of all the feature items in all the genres with respect to all the users will be set to 50 at the beginning stage of operation. In addition, this is applicable to persons who become new users after the present system is brought into operation. For such new users, user taste information T in which the taste values of all the feature items are 50 is prepared, and is stored in the user taste information storage unit 110.

As a matter of course, instead of setting the default values at the beginning stage, a questionnaire survey may be conducted with respect to individual users, and they may establish the initial values of taste values by themselves with respect to respective feature items. However, as described above, since a great deal of work is imposed on respective users if such a questionnaire survey is conducted, from a practical standpoint, it is preferable to establish the default values at the beginning stage as described above. If the first updating process is carried out by the taste value updating unit 140 even if the default values are established at the beginning stage, the user taste information T is amended to correct taste values, in which the tastes of respective users are accurately reflected, at the moment, wherein there does not arise any large problem.

Further, the timing of the updating process by the taste value updating unit 140 may be variously established in compliance with an operation pattern of the system. For example, each time a new target store ID is recorded in the target store recording unit 150, it is possible to update the user taste information T with respect to a user and a genre pertaining to the new target store ID. Alternatively, such a schedule is determined that updating is carried out once a week for individual users, and updating can be appropriately carried out in compliance with the schedule.

On the other hand, it is necessary that respective store evaluation information E is stored in the store evaluation information storage unit 120 for individual stores. Therefore, in the case of the system according to Embodiment 1, an operation administrator of the system carries out work for preparing the store evaluation information E for respective stores before operation of the system is commenced. The system administrator may enter genre codes and evaluation values for respective feature items while browsing the respective store information (Web content data) in the store information storage unit 100. In some cases, the system administrator actually visits stores and may determine the evaluation values. In fact, however, from a practical standpoint, it is preferable to construct a system according to Embodiment 2 described in Section 6. Since, in the system according to Embodiment 2, evaluation values of respective stores are automatically determined by voting actions of users, it is sufficient that, for example, default values of evaluation values=50 are given for all the feature items of all the stores at the beginning stage of operation.

<<<Section 6. Configuration and Features of Embodiment 2>>>

Embodiment 1 described above is featured in that, as described in Section 3, the user taste information T in the user taste information storage unit 110 is automatically updated by the taste value updating unit 140. Embodiment 2 described herein pertains to a system to which a function of automatically updating the store evaluation information E in the store evaluation information storage unit 120 is added.

Figure 11:
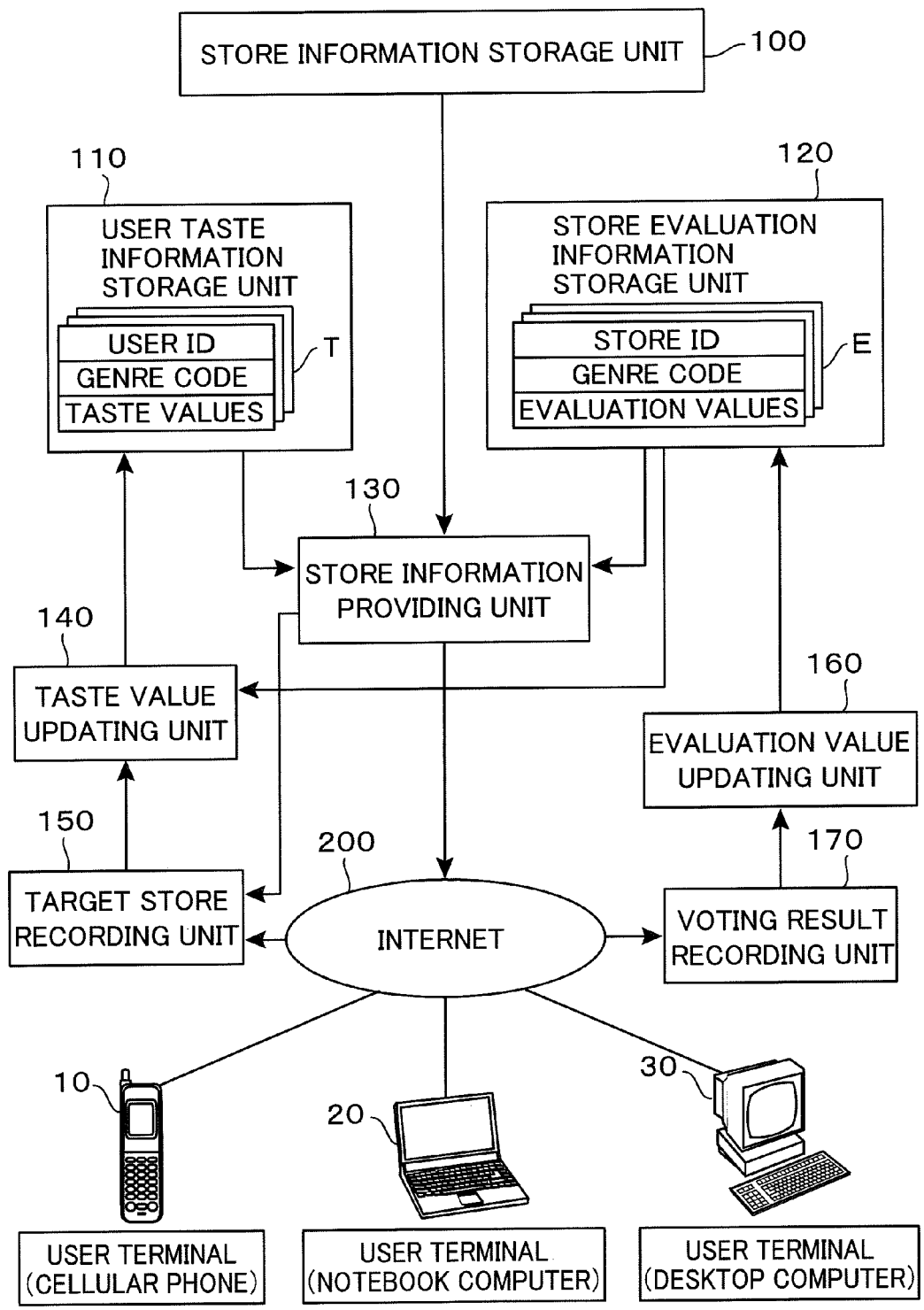
FIG. 11 is a block diagram showing a basic configuration of an information providing system according to Embodiment 2 of the present invention.

FIG. 11 is a block diagram showing a basic configuration of an information providing system according to Embodiment 2. The system according to Embodiment 2 is such that an evaluation value updating unit 160 and a voting result recording unit 170 are added to the system shown in FIG. 1. Therefore, a description is given below of these two new components.

First, the voting result recording unit 170 is a component having a function of accumulating and recording voting results for individual stores when users vote personal evaluation values for feature items of a specified store. In detail, the voting result recording unit 170 may be composed of a Web server to present a voting Web page to user terminals, an enter portion for entering personal evaluation values (voting values) of respective users on the voting Web page, and a memory portion for storing the voting results.

Figures 12, 13:
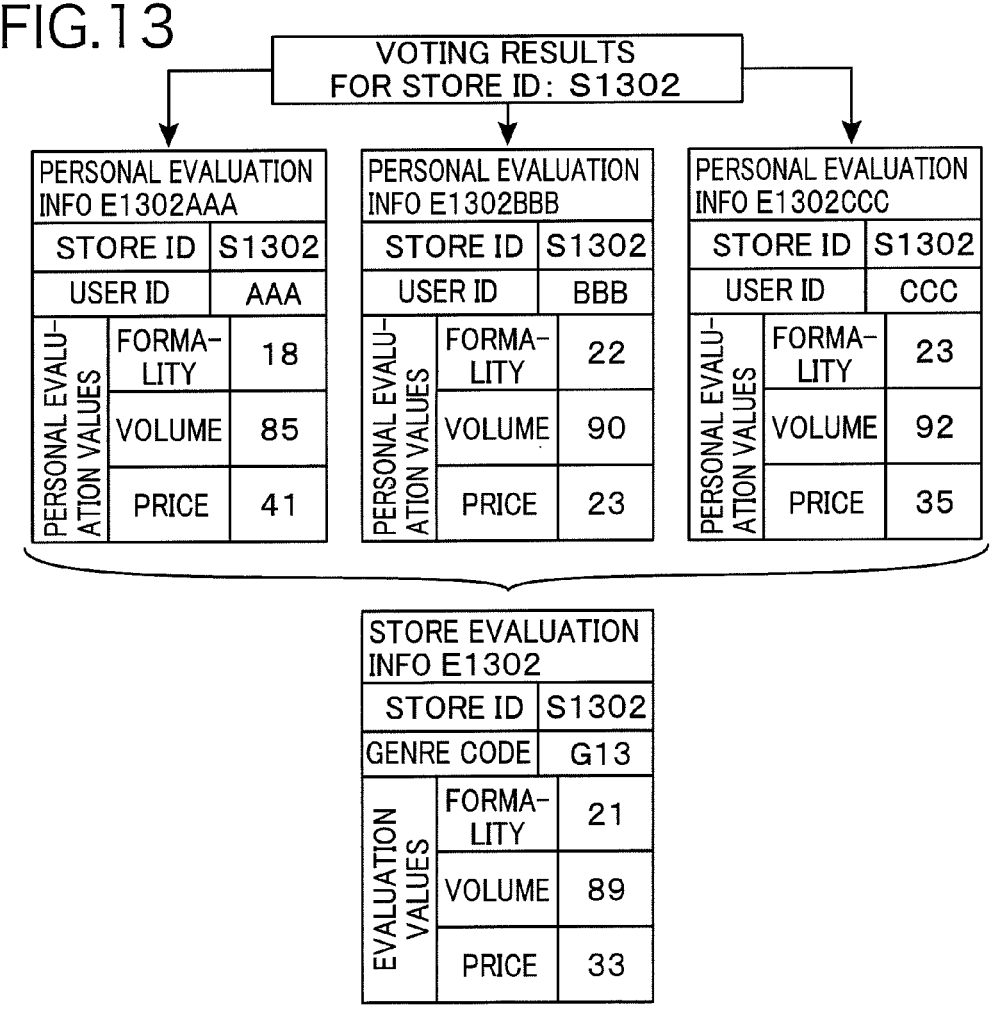
FIG. 12 is a view showing one example of a voting screen presented by a voting result recording unit 170 of the information providing system according to Embodiment 2 shown in FIG. 11.
FIG. 13 is a view showing one example of voting results (personal evaluation information) recorded in a voting result recording unit 170 of the information providing system according to Embodiment 2 shown in FIG. 11, and of store evaluation information updated by a process of an evaluation value updating unit 160 thereof.

FIG. 12 is a view showing one example of a voting screen (Web page) presented on a display of a user terminal by the voting result recording unit 170. The example illustrated is a screen for user AAA to vote evaluation values with respect to the store of [Just-Boiled Spaghetti Shop XYZ]. When user AAA tries to cast a vote with respect to the store of [Just-Boiled Spaghetti Shop XYZ] from the user terminal, data for displaying such a voting Web page as shown is transmitted from the voting result recording unit 170 to the user terminal. User AAA enters personal evaluation values in the range from 0 through 100 with respect to respective feature items, that is, three items of formality, volume and price in connection to the store of [Just-Boiled Spaghetti Shop XYZ], which becomes an object to be evaluated, on the Web page.

In the example shown in FIG. 12, in order to facilitate entry task of the personal evaluation values, the left side of the drawing shows the titles of respective feature items, and the right side thereof shows numerical lines that show the evaluation values from 0 through 100. A marker shown with a black inverted triangle is disposed at a predetermined point of the numerical lines. A user may establish a desired personal evaluation value in the range from 0 through 100 by dragging the marker leftward or rightward using a mouse, etc. If the user establishes respective desired personal evaluation values for each feature item and clicks the [Vote] button, the personal evaluation information established by the user are recorded in the voting result recording unit 170 as personal evaluation values with respect to the store.

Where the system according to Embodiment 2 is brought into operation, it is necessary that cooperation is requested so as for respective users to vote the personal evaluation values for the store when the user actually utilizes respective stores. Users who accept the cooperation access the voting result recording unit 170 through the user terminal, carry out entry to specify the individual user ID and the store ID that becomes an object to be evaluated, and cast a vote.

The upper stage of FIG. 13 shows an example of the voting results (personal evaluation information) recorded in the voting result recording unit 170. The three sets of personal evaluation information shown here pertain to the store of [Just-Boiled Spaghetti Shop XYZ] specified by the store ID [S1302], and are the voting results made by three users AAA, BBB and CCC. The respective personal evaluation information is composed of the store ID, the user ID, and the personal evaluation values (evaluation values of individual users for each of the feature items). For example, the personal evaluation information E1302AAA shown at the extreme left side is composed of data consisting of [Store ID: S1302], [User ID: AAA], and [Personal evaluation values: Formality 18, volume 85 and price 41].

The voting may be anonymously carried out. In this case, the user is not required to enter the user ID when voting, and it is not necessary that the user ID is included in the personal evaluation information. However, it is favorable that voting with the user ID specified is carried out in order to prevent inaccurate voting actions through mischief. As a matter of course, respective personal evaluation values are arbitrarily determined based on subjective impression when individual users utilize the store, wherein differences may arise among individuals. However, if voting is carried out by a number of users, the accuracy of evaluation will be accordingly improved.

Thus, the results of voting carried out by a number of users are gradually accumulated and recorded for respective stores in the voting result recording unit 170. The evaluation value updating unit 160 extracts the voting results recorded in the voting result recording unit 170 for individual stores, and carries out a process of updating the evaluation values of the store evaluation information E for the store, which is stored in the store evaluation information storage unit 120, based on the extracted voting results.

The lower stage of FIG. 13 is a view of the store evaluation information E updated by the process of the evaluation value updating unit 160. In the embodiment shown here, an updating process is carried out in which an average value of the personal evaluation values for a particular feature item of the personal evaluation information [E1302AAA], [E1302BBB] and [E1302CCC] is made into a new evaluation value for the particular feature item of the store evaluation information E1302. For example, the evaluation value 21 for the feature item [Formality] of the store evaluation information E1302 shown at the lower stage of FIG. 13 is a value obtained by averaging respective evaluation values 18, 22 and 23 for the feature item [Formality] of the personal evaluation information [E1302AAA], [E1302BBB] and [E1302CCC] shown at the upper stage of FIG. 13.

When the above-described updating process is carried out, "a part of the voting result for individual stores" may be extracted instead of extracting "all of the voting results for individual stores" recorded in the voting result recording unit 170, and may be utilized for updating. For example, if the voting result recording unit 170 is devised so as to record the voting results along with the recording time information when recording the former, the evaluation value updating unit 160 extracts only those the recording time of which is within a predetermined period, among the voting results recorded in the voting result recording unit 170 and may update the evaluation values of the store evaluation information. Accordingly, for example, if only the voting results recorded within the last three months on the basis of this point in time are extracted and utilized for updating, updating will be enabled with reference to only the personal evaluation values for the most recent three months. Therefore, even where a specified store is newly re-opened with the interior decoration renewed, the evaluation values of the respective feature items can be kept on the newest evaluation values. As a matter of course, the voting results recorded the previous three months may be deleted sequentially.

Also, it is possible that weighted average values are obtained by utilizing the recording time of the voting results. In the example shown in FIG. 13, although updating is carried out with simple average values of the personal evaluation values made into new evaluation values, weighted average values may be calculated by placing a greater weight on the personal evaluation values pertaining to more recently recorded voting results, and the weighted average values are used as new evaluation values to carry out updating, wherein it is possible to obtain store evaluation information with weight placed on more recent evaluation.

The timing of an updating process by the evaluation value updating unit 160 may be variously established in compliance with the operation pattern of the system. For example, it is possible to carry out a process of updating the store evaluation information of a store pertaining to the voting results each time a new voting result (personal evaluation information) is recorded in the voting result recording unit 170. Alternatively, such a schedule is determined that updating is carried out once a week for individual stores, and updating can be appropriately carried out in compliance with the schedule. Thus, since automatic updating is carried out, the respective evaluation values can be automatically corrected to appropriate values in line with operation of the system even if default values are established as the evaluation values of the store evaluation information E of respective stores at the beginning stage of operation of the present system.

Thus, in the system according to Embodiment 2 described here, not only is the user taste information T automatically updated by the taste value updating unit 140 but also the store evaluation information E may be automatically updated by the evaluation value updating unit 160. As described above, the evaluation values in the store evaluation information E may be utilized for an updating process of the user taste information T by the taste value updating unit 140. In the system according to Embodiment 2, since the evaluation values in the store evaluation information E are updated and are always kept on appropriate values, such a multiplier effect can be expected that the details of the user taste information T updated based thereon can be kept on appropriate values.

Section 4 showed some examples of a detailed method for an interest recognition process (a process for recognizing that users had interest in specified stores) by the target store recording unit 150. In Embodiment 2 described herein, when a user utilized a specified store, the user would vote for the store in the voting result recording unit 170. This voting action is nothing other than a declaration of intention to say that "the user has interest in the store." Therefore, when such voting was executed, the voting result recording unit 170 records the voting result, and at the same time, informs the target store recording unit 150 of a report that "a specified user voted for a specified store." Thus, the target store recording unit 150 that receives the report may record the store ID as a target store ID with respect to the user.

<<<Section 7. Configuration and Features of Embodiment 3>>>

Embodiment 3 described here pertains to an information providing system capable of handling tastes of accompanying persons taken into consideration. There are many cases where a user usually accompanies persons when the user utilizes various stores. Thus, where a group consisting of a plurality of users utilizes a specified store, some of the users will have a high degree of satisfaction if the store is as per taste thereof, and other users will have a lower degree of satisfaction if the store is not matched with the taste thereof. The system according to Embodiment 3 described herein has a function of causing a plurality of users to report the degree of satisfaction and selecting store information provided to respective users with the degree of satisfaction taken into consideration when respective users utilize a store as a group.

Figure 14:
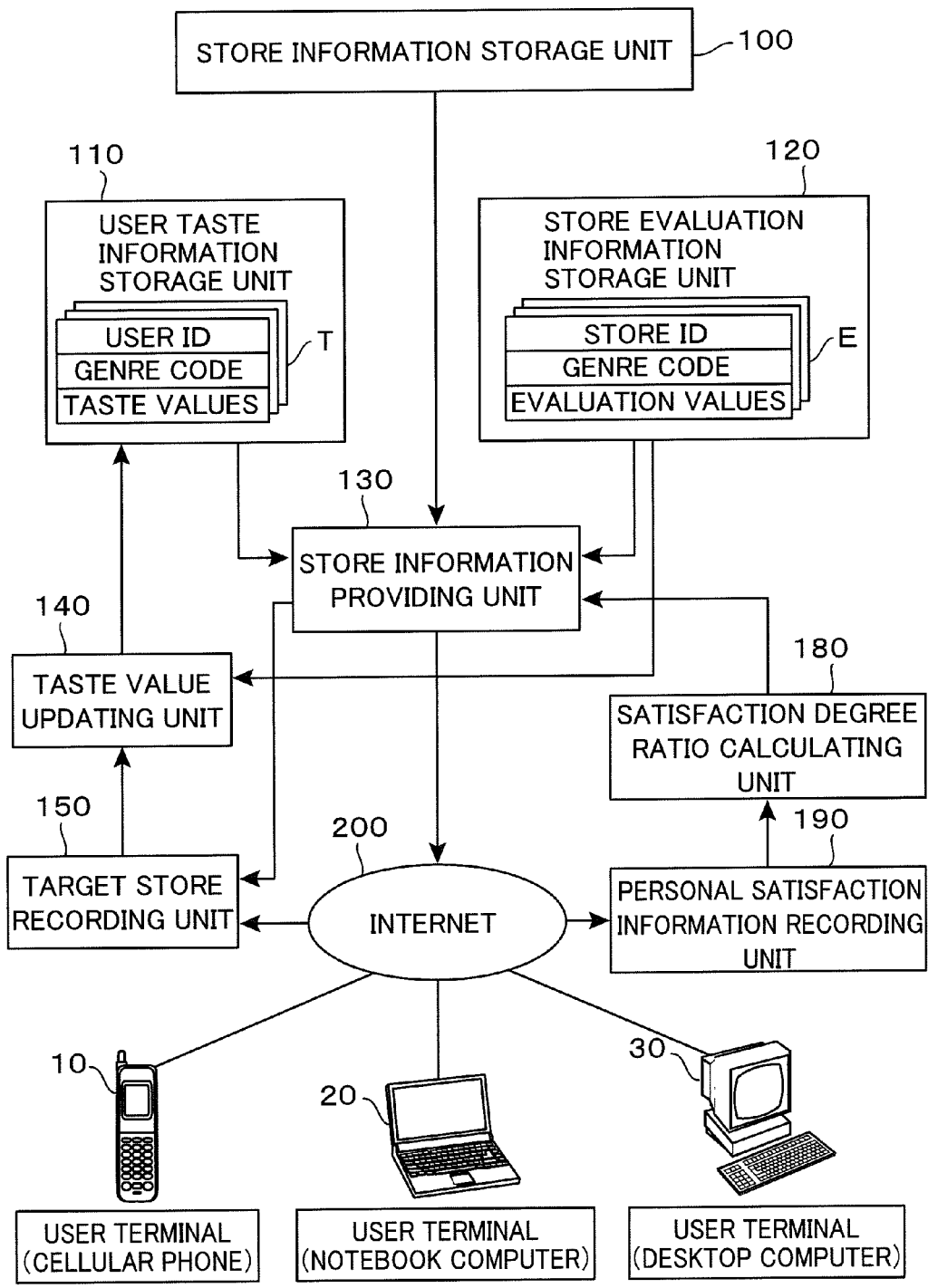
FIG. 14 is a block diagram showing a basic configuration of an information providing system according to Embodiment 3 of the present invention.

FIG. 14 is a block diagram showing a basic configuration of an information providing system according to Embodiment 3. The system according to Embodiment 3 is such that a satisfaction degree ratio calculating unit 180 and a personal satisfaction information recording unit 190 are added to the system according to Embodiment 1 shown in FIG. 1. Hereinafter, a description is given of the functions of these two new components.

First, the personal satisfaction information recording unit 190 has a function of accumulating and recording personal satisfaction information including group composition information to specify users who compose a group, a genre of the store that the users utilized, user IDs to specify individual users and personal satisfaction degree of the users when a plurality of users utilized a specified store. In detail, the personal satisfaction information recording unit 190 may be composed of a Web server to present a Web page for entering personal satisfaction information to user terminals, an enter portion for entering the personal satisfaction information of respective users on the Web page, and a memory portion for storing the entered personal satisfaction information.

Here, a case where two users AAA and BBB utilized the store of [Just-Boiled Spaghetti Shop XYZ] together is taken into consideration. In this case, this means that a group consisting of two users AAA and BBB has utilized the store. However, from the viewpoint of user AAA, the user utilized the store while accompanying user BBB, and from the viewpoint of user BBB, the user utilized the store while accompanying user AAA. Therefore, it is devised that both the users AAA and BBB are caused to make a report on the satisfaction degrees after utilization.

FIG. 15 is a view showing one example of a personal satisfaction information enter screen (Web page) presented on a display of the user terminal by the personal satisfaction information recording unit 190. The example illustrated is a screen for user AAA to enter the satisfaction degree with respect to the store of [Just-Boiled Spaghetti Shop XYZ]. When user AAA gives an instruction of entering the satisfaction degree in regard to the store of [Just-Boiled Spaghetti Shop XYZ] to the personal satisfaction information recording unit 190 using the user terminal, data for displaying the Web page as illustrated is transmitted from the personal satisfaction information recording unit 190 to the user terminal. User AAA enters the satisfaction degrees of the accompanying person and the user himself/herself on the Web page.

Although information of the accompanying person is handled as a user ID in the personal satisfaction information recording unit 190, the embodiment shown here is devised so that, in order to simplify the enter operation, accompanying persons of user AAA are registered in advance, the names of the registered accompanying persons are presented on the enter screen as a list, and the entry task to specify the accompanying person is completed only by selecting the name of a desired accompanying person. In the Web screen shown in FIG. 15, the names of accompanying persons registered in advance are displayed in the form of a list in the right field of

[Accompanying person:], user AAA may carry out an operation of selecting user BBB in the list.

On the other hand, the personal satisfaction degree may be defined as a numerical value in the range from 0 through 100. In the example shown in FIG. 15, in order to facilitate the entry task of the personal evaluation values, a numerical line showing evaluation values of 0 through 100 is displayed and a marker shown with a black inverted triangle is disposed at a predetermined point. The user may enter a desired personal satisfaction degree in the range from 0 through 100 by dragging the marker leftward or rightward. As the user moves the marker to a desired position and clicks [Enter] button, the personal satisfaction information entered by the user will be recorded in the personal satisfaction information recording unit 190.

Also, where a system in which Embodiment 3 described here and Embodiment 2 described above are integrated is used, it is preferable that the voting screen necessary for Embodiment 2 and the satisfaction information enter screen necessary for Embodiment 3 are integrated. FIG. 16 is a view showing one example of an enter screen in which the voting screen shown in FIG. 12 and the satisfaction information enter screen shown in FIG. 15 are integrated. In the enter screen, [Satisfaction degree] is handled at the same level as [Formality], [Volume] and [Price]. As a matter of course, in view of system processing, [Satisfaction degree] is a parameter completely different from [Formality], [Volume] and [Price]. The latter covers personal evaluation values used for updating process by the evaluation value updating unit 160 as described in Section 6, and the former is a value utilized for selection by the store information providing unit 130 as described later. However, in view of the user's side, both of them are numerical values ranging from 0 through 100. In terms of a user interface, it is convenient that both are handled at the same level as in the example shown in FIG. 16. User AAA establishes values for four items consisting of [Formality], [Volume], [Price] and [Satisfaction degree] on the enter screen shown in FIG. 16, and may click the [Vote] button.

In the above, although a description was given of an entry task by user AAA with reference to the example of the enter screen of FIG. 15 and FIG. 16, user BBB may carry out the same entry task as above. In this case, entry is carried out in the form of [User: BBB, Accompanying person: AAA]. Thus, even if a plurality of users utilized a store together, respective users are caused to enter his/her personal satisfaction information, respectively.

Figures 17A, 17B, 18:
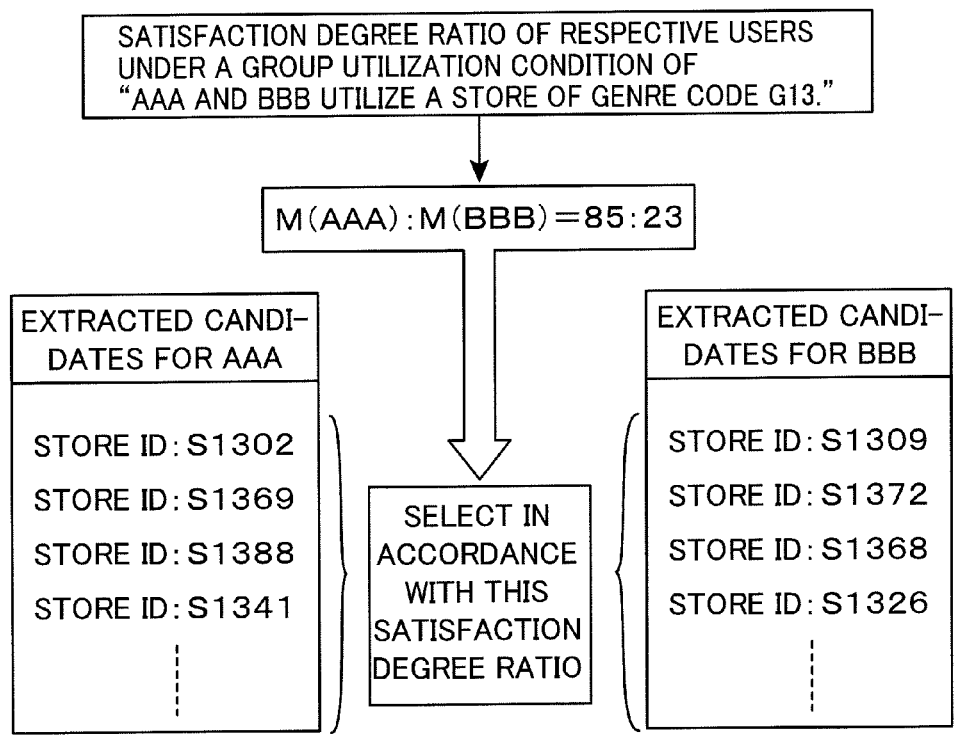
FIG. 17A and FIG. 17B are views each showing one example of personal satisfaction information recorded in the personal satisfaction information recording unit 190 of the information providing system according to Embodiment 3 shown in FIG. 14.
FIG. 18 is a view showing a concept of a process by which the store information providing unit 130 carries out selection of store information based on a satisfaction degree ratio calculated by a satisfaction degree ratio calculating unit 180 of the information providing system according to Embodiment 3 shown in FIG. 14.

FIG. 17A and FIG. 17B are views showing examples of personal satisfaction information recorded in the personal satisfaction information recording unit 190 via an entry task by users AAA and BBB. FIG. 17A shows personal satisfaction information M1AAA recorded by an entry task by user AAA, which is data consisting of [User ID: AAA], [Accompanying person ID: BBB], [Store ID: S1302], [Genre code: G13] and [Personal satisfaction degree: 85].

The personal satisfaction information M1AAA is information showing the fact that, when a group of users AAA and BBB utilized a store of genre code G13 specified by the store ID of S1302, the personal satisfaction degree of user AAA is 85. On the other hand, FIG. 17B is personal satisfaction information M1BBB recorded by an entry task by user BBB, which differs from the personal satisfaction information M1AAA in that [User ID] and [Accompanying person ID] are replaced with each other and the personal satisfaction degree is 23.

In addition, although the respective personal satisfaction information M1AAA and M1BBB shown in FIG. 17A and FIG. 17B includes the store ID, it does not matter that the store ID is omitted. Requisite items of the personal satisfaction information are group composition information to specify users that compose a group who utilized a specified store, a genre code showing the genre of the utilized store, user IDs to specify the individual users, and personal satisfaction degrees of the users. In the case of the example shown in FIG. 17A, [User ID: AAA] and [Accompanying person ID: BBB] function as the group composition information, and in the case of the example shown in FIG. 17B, [User ID: BBB] and [Accompanying person ID: AAA] function as the group composition information.

Now, the satisfaction degree ratio calculating unit 180 carries out a process for calculating the satisfaction degree ratio between respective users under a group utilization condition of "a specified group utilizes a specified genre of store" based on the personal satisfaction information M recorded in the personal satisfaction information recording unit 190. A description is given below of the detailed example thereof.

A case is considered where the sets of the personal satisfaction information M1AAA and M1BBB shown in FIG. 17A and FIG. 17B are recorded in the personal satisfaction information recording unit 190. These sets of information correspond to a group utilization condition of "a specified group utilizes a specified genre of store." In detail, these correspond to the group utilization condition of "a group of users AAA and BBB utilize a store of genre code G13." Thus, the ratio of [85:23] is obtained as the satisfaction degree ratio between respective users under the group utilization condition. The ratio means that, with respect to the past utilization results under the group utilization condition of "the group of users AAA and BBB utilize the store of genre code G13," the personal satisfaction degree of user BBB was 23 while the personal satisfaction degree of user AAA was 85. In other words, under the utilization condition, it is found that, while the satisfaction degree of user AAA is considerably high, the satisfaction degree of user BBB is considerably low.

Furthermore, in the example shown in FIG. 17A and FIG. 17B, there are only two sets of personal satisfaction degree information, that is, the personal satisfaction degree information of user AAA and the personal satisfaction degree information of user BBB, under an inherent group utilization condition of "a group of users AAA and BBB utilize a store of genre code G13." Therefore, it is possible to calculate the satisfaction degree ratio of [85:23] by adopting the ratio of respective personal satisfaction degrees 85 and 23 as they are. However, there may be cases where a plurality of sets of personal satisfaction degree information of respective users under the same group utilization condition exist. For example, if users AAA and BBB had meals at three different restaurants of [Italian food], personal satisfaction degree information would be collected for individual restaurants (that is, six sets of personal satisfaction information are obtained in total). In this case, the group utilization conditions are the same in either case. In such a case, it may be devised that a ratio of the average values of personal satisfaction degrees for individual users included in the personal satisfaction information utilized for calculation is obtained as a satisfaction degree ratio. For example, where the personal satisfaction degrees of user AAA for three stores were 85, 80 and 75, respectively, and the personal satisfaction degrees of user BBB for the three stores were 23, 25 and 30, respectively, the satisfaction degree ratio under the utilization condition may be obtained by calculation of $((85+80+75)/3):((23+25+30)/3)=80:26$.

In addition, although the personal satisfaction information will be recorded in the personal satisfaction information recording unit 190 sequentially, the satisfaction degree ratio calculating unit 180 may be devised so as to calculate the satisfaction degree ratio by using a part of the personal satisfaction information instead of carrying out calculation using all of the personal satisfaction information under a specified utilization condition, which are recorded in the personal satisfaction information recording unit 190. For example, if the personal satisfaction information recording unit 190 is devised so as to record the personal satisfaction information along with the recording time information, the satisfaction degree ratio calculating unit 180 may extract only those, the recording time of which is within a predetermined period, among the personal satisfaction information recorded in the personal satisfaction information recording unit 190 and may calculate the satisfaction degree ratio. For example, if only the personal satisfaction information recorded within the last three months on the basis of the present time are extracted and utilized for calculation, it becomes possible to carry out calculation with reference to only the personal satisfaction information for the recent three months. As a matter of course, in this case, the personal satisfaction information recorded the previous three months may be deleted sequentially. Furthermore, weighted average values may be obtained by utilizing the recording time of the personal satisfaction information.

The timing for calculating the satisfaction degree ratio by the satisfaction degree ratio calculating unit 180 may be variously established in compliance with the operation pattern of the system. For example, it is possible to carry out a process for calculating the satisfaction degree ratio under a predetermined utilization condition pertaining to the personal satisfaction information each time new personal satisfaction information is recorded in the personal satisfaction information recording unit 190. Alternatively, such a schedule is determined that updating is carried out once a week for respective utilization conditions, and updating can be appropriately carried out in compliance with the schedule, and the satisfaction degree ratio with respect to a utilization condition pertaining to a request may be calculated sequentially when such a request is received from the store information providing unit 130.

As a matter of course, respective group utilization conditions differ from each other depending on the composing members of the group, and differ from each other depending on the genres of the store utilized. Therefore, the satisfaction degree ratio will be separately defined under the group utilization condition of "a group of users AAA and CCC utilize a store of genre code G13" and the satisfaction degree ratio will also be separately defined under the group utilization condition of "a group of users AAA and BBB utilize a store of genre code G21."

Here, the reason why the group utilization condition is made different depending on respective composing members of the group is that it is considered that the answer to the proposition of "who takes the initiative in selecting a store" differs depending on a combination of the users. For example, it is not unusual that there is a tendency mainly for user CCC to determine a store in the case of the group of [users AAA and CCC] while there is a tendency mainly for user AAA to determine a store in the case of the group of [users AAA and BBB]. Also, the reason why the group utilization conditions are made different depending on the genres of store utilized is that it is considered that the answer to the proposition of "who takes the initiative in selecting a store" differs depending on the genre of store. For example, it is not an unusual case where BBB takes the initiative in selecting a store of [Women's clothing] while AAA takes the initiative in selecting a store of [Italian food] in the case of the same group of [users AAA and BBB].

Thus, the values of a satisfaction degree ratio between users under the respective group utilization conditions, which are calculated by the satisfaction degree ratio calculating unit 180, are utilized for selection of the store information in the store information providing unit 130. That is, when the store information providing unit 130 receives a provision request of store information under a specified group utilization condition, the store information providing unit 130 extracts a sets of the store information suitable for individual users pertaining to the specified group utilization condition, respectively, as candidates. Then, the store information providing unit 130 selects and provides the store information among the candidates in compliance with the satisfaction degree ratio under the specified group utilization condition.

A further detailed description is given with reference to a detailed example thereof. Here, in the system shown in FIG. 14, it is assumed that the terminal device operated by user AAA has requested the store information providing unit 130 to provide the store information, where the provision request includes accompanying person information of [accompanying person: BBB] and a keyword of [Italian Restaurant Tokyo] (the keyword enter field and the accompanying person name enter field may be prepared on the screen of the Web page in which the retrieval instructions are entered in order to enable such a provision request). This provision request eventually is a request to provide the suitable store information under inherent group utilization condition of "a group of the users AAA and BBB utilize a store of genre code G13 (Italian food)."

The store information providing unit 130 that received such a provision request carries out, as described in Section 2, a process of selecting by applying two types of sieves to a number of sets of store information stored in the store information storage unit 100 and a process of placing and providing finally selected store information in a summary list. Herein, the first sieve is a sieve based on the above-described keyword, and the second sieve is a sieve based on comparison of the user taste information T with the store evaluation information E. However, in the above-described example, the provision request includes the accompanying person information and it is under a premise that a plan of utilizing a store is established by a group. Therefore, the selection process by the second sieve is required to be a process in which all the tastes of individual users composing the group are reflected. That is, in the above-described example, such a selection is to be carried out that both the user taste information TAAA of user AAA and the user taste information TBBB of user BBB are taken into consideration.

Therefore, in Embodiment 3, the second sieve is separately carried out for individual users. That is, a sets of store information suitable for individual users will be extracted as candidates. The left side of FIG. 18 shows candidates of the store information extracted for user AAA, and the right side thereof shows candidates of the store information extracted for user BBB. It is a matter of course that the user taste information TAAA with respect to user AAA and the user taste information TBBB with respect to user BBB, which are stored in the user taste information storage unit 110, are different from each other. And, respective candidates listed at the left side of FIG. 18 are those extracted by utilizing the former (candidates extracted by a sieve based on comparison of the user taste information TAAA with the respective store evaluation information E), and the candidates listed at the right side of the same drawing are those extracted by the latter (candidates extracted by a sieve based on comparison of the user taste information TBBB with the respective store evaluation information E).

Thus, if the second sieve is applied separately for each user, the candidates extracted as a result thereof naturally become different for each user. Accordingly, in Embodiment 3, the third sieve is further adopted, and these extracted candidates are further selected. The satisfaction degree ratio calculated by the satisfaction degree ratio calculating unit 180 is used for the selection process by the third sieve.

Since, in the case of the above-described example, the store information under the group utilization condition of "the group of users AAA and BBB utilize a store of genre code G13 (Italian food)" is requested for provision, the store information extracted as candidates is selected (classified by the third sieve) in compliance with the satisfaction degree ratio under the group utilization condition. For example, in the case where the satisfaction degree ratio [M(AAA):M(BBB)] under the group utilization condition is calculated to be [85:23], it is sufficient that selection including extracted candidates with respect to user AAA and extracted candidates with respect to user BBB is carried out in compliance with the ratio of [85:23]. In order to carry out "selection responsive to the ratio," the following two policies may be considered.

The first policy is to select store information at a probability in response to an inverse ratio of the satisfaction degree ratio for individual users among the candidates of store information extracted for individual users. For example, in the example shown in FIG. 18, if the store information is selected at a probability responsive to the inverse ratio of the satisfaction degree ratio [M(AAA):M(BBB)]=[85:23], such selection is carried out that the probability for selection from the extracted candidates with respect to user AAA shown at the left side of the drawing becomes 23/(85+23) and the probability for selection from the extracted candidates with respect to user BBB shown at the right side thereof becomes 85/(85+23).

The first policy is based on an idea of "adjust so as to obtain an equal satisfaction degree for each user." Although, in the above-described example, a result of [M(AAA):M(BBB)]=[85:23] was obtained, this means that, "as a result of having utilized the store of genre code G13 (Italian food) by the group of users AAA and BBB, the satisfaction degree of BBB is only 23 while the satisfaction degree of AAA is 85." This means that, "as a result of having utilized Italian restaurants by users AAA and BBB, the satisfaction degree of user BBB is considerably low while the satisfaction degree of user AAA is considerably high." Therefore, if such an idea of "adjust so as to obtain an equal satisfaction degree for each user" is adopted, such a conclusion may be obtained that a store with which user BBB is satisfied is recommended as much as possible the next time when users AAA and BBB utilize an Italian restaurant. If store information is selected at a probability responsive to an inverse ratio of the satisfaction degree ratio, the store information matched with the taste of user BBB is selected at the probability of 85/(85+23) while the store information matched with the taste of user AAA is selected at the probability of 23/(85+23), wherein the store information matched with the taste of user BBB will be selected with priority.

On the other hand, the second policy is to select store information at a probability responsive to a direct ratio of the satisfaction degree ratio for individual users among candidates of the store information extracted for individual users. For example, in the example shown in FIG. 18, if the store information is selected at a probability responsive to a direct ratio of the satisfaction degree ratio [M(AAA):M(BBB)]=[85:23], such selection will be carried out that the probability for selection from the extracted candidates with respect to user AAA shown at the left side of the drawing becomes 85/(85+23), and the probability for selection from the extracted candidates with respect to user BBB shown at the right side thereof becomes 23(85+23).

The second policy is based on an idea of "respecting the initiative in the past selection of stores." In the above-described example, a result of [M(AAA):M(BBB)]=[85:23] was obtained, and it means that, "as a result of having utilized the store of genre code G13 (Italian food) by the group of users AAA and BBB, the satisfaction degree of user BBB is only 23 while the satisfaction degree of user AAA is 85." The truth is that "when users AAA and BBB utilize an Italian restaurant, the initiative of selecting a store exists in user AAA." Therefore, if an idea of "respecting the initiative in the past selection of stores" is adopted, there is a high possibility for a store to be selected under the initiative of user AAA next time when users AAA and BBB utilize an Italian restaurant as well. Accordingly, such a conclusion is obtained that a store matched with the taste of user AAA is recommended as much as possible. If store information is selected at the probability responsive to a direct ratio of the satisfaction degree ratio, the store information matched with the taste of user BBB will be selected at the probability of 23/(85+23) while the store information matched with the taste of user AAA will be selected at the probability of 85(85+23), wherein the store information matched with the taste of user AAA will be selected with priority.

Generally, which one of the first policy (inverse ratio) or the second policy (direct ratio) is to be adopted is a matter depending on the relationship between the users who compose the group. However, from a practical standpoint, which policy is to be adopted may be established in advance by classifying for cases where the relationship between users AAA and BBB is sweethearts, husband and wife, fellow workers and classmates, etc.

Also, some methods are considered when presenting the store information integrated by applying the third sieve as a summary list as shown in FIG. 7. The first method is such that the store information is sorted and listed in the order of higher approximation degree (in the order of shorter distance between the distal end points of vectors) since the degree of approximation was investigated in vector space as shown in FIG. 8 in the second sieve classification. With this method, the candidates at the left side of FIG. 18 and the candidates at the right side thereof are mixed and arranged in the summary list. The second method is such that the candidates for a user having a lower satisfaction degree ratio are first disposed in the list. In the above-described example, the candidates extracted with respect to user BBB are first arranged in the list. This is a method matched with the idea of "adjust so as to obtain an equal satisfaction degree for each user." The third method is such that candidates with respect to a user having a greater satisfaction degree ratio are first arranged in the list. In the above-described example, the candidates extracted with respect to user AAA will be first arranged in the list. This is a method matched with the idea of "respecting the initiative in the past selection of stores."

As described above, although a description was given of the third embodiment, taking store utilization by a group of two users AAA and BBB for instance, it is a matter of course that the present embodiment is applicable to a group consisting of three or more users. For example, where three users AAA, BBB and CCC utilized a store, each of the users may enter personal satisfaction information in the personal satisfaction information recording unit 190. In this case, for example, in the enter screen of AAA, entry may be carried out with BBB and CCC being the accompanying persons. Also, the satisfaction degree ratios will be given with three numbers such as [M(AAA):M(BBB):M(CCC)].

<<<Section 8. Configuration and Features of Embodiment 4>>>

Usually, there are many cases where a user intends to carry out a certain action when a user intends to obtain some information by accessing the Internet. For example, when accessing Web pages of a restaurant, it is considered that the user intends to have a meal. Also, when accessing Web pages of a movie theater, the user intends to go see a movie. Furthermore, there are many cases where a unique behavior pattern is fixed for each individual user.

For example, there are some users who usually have a behavior pattern of having a meal at a restaurant after having seen a movie along with an accompanying person, and talking with him or her in regard to the content of the movie, and there are other users who usually have a behavior pattern of having a meal first and enjoying seeing a movie on a full stomach. In the former case, it is significant to provide information regarding meals together when the user requests movie information. However, in the latter case, since there is a possibility for a user to have already finished a meal when the user requests movie information, there may be cases where it is no use providing meal information together with movie information.

A system according to Embodiment 4 described in Section 8 has a function of providing appropriate information with usual behavior patterns of each of users taken into consideration.

Figure 19:
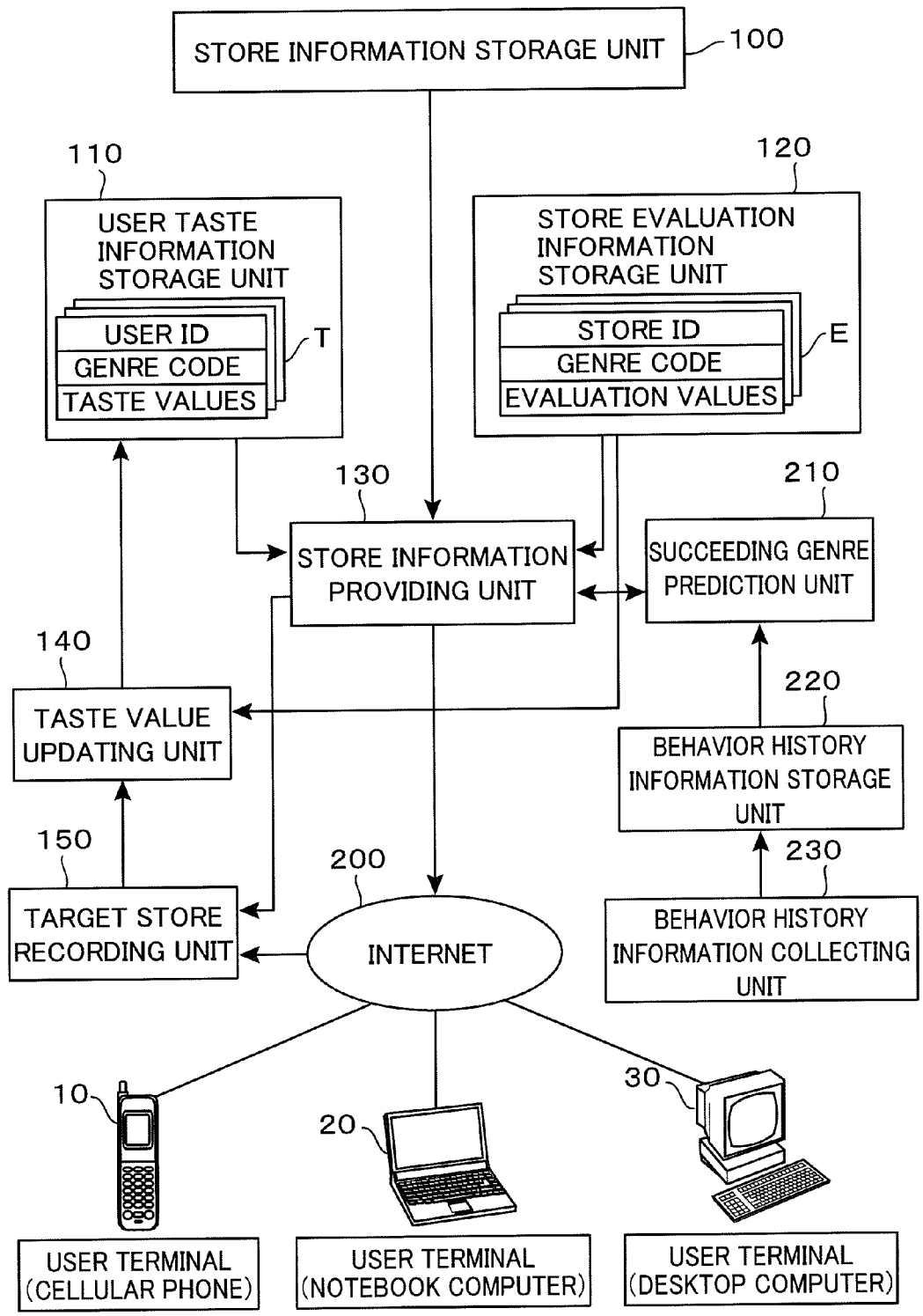
FIG. 19 is a block diagram showing a basic configuration of an information providing system according to Embodiment 4 of the present invention.

FIG. 19 is a block diagram showing a basic configuration of an information providing system according to Embodiment 4. The system according to Embodiment 4 is such that a succeeding genre prediction unit 210, a behavior history information storage unit 220 and a behavior history information collecting unit 230 are added to the system according to Embodiment 1 shown in FIG. 1. Therefore, hereinafter, a description is given of these three new components.

First, the behavior history information collecting unit 230 has a function of collecting behavior history information including a user ID of user, a genre code of a store, and utilization time when the user utilizes a specified store. For example, where user AAA utilized [Just-Boiled Spaghetti Shop XYZ], behavior history information including data such as [User ID: AAA], [Genre code: G13] and [Utilization time: 25/Nov/2006/17:53] is collected (since it is sufficient to specify the order of utilization of stores, the data of utilization time does not necessarily include the data of the hour and minute level). In other words, the behavior history information is such that it shows [when, which genre of store, who utilized].

Although it is necessary to recognize [a specified user utilized a specified store] in order to collect such information, various methods described in Section 4 (method for a user to report the fact of utilization of store, method for recognizing the position of portable terminal device with a GPS function, and method for recognizing that communications have been made between a store installation unit and a portable terminal device which the user carries), for example, may be used. Alternatively, in cases where Embodiment 2 described in Section 6 and Embodiment 3 described in Section 7 are concurrently used, it is possible to recognize it by users carrying out an entry task of predetermined items on the Web page as shown in FIG. 15 or FIG. 16 that [specified users utilized a specified store].

Thus, the behavior history information collected by the behavior history information collecting unit 230 is stored in the behavior history information storage unit 220. FIG. 20A and FIG. 20B are views showing examples of behavior history information stored in the behavior history information storage unit 220. As illustrated, separate independent storage areas are secured for each individual user. The behavior history information regarding user AAA is stored in the storage area shown in FIG. 20A, and the behavior history information regarding user BBB is stored in the storage area shown in FIG. 20B.

In the case of the examples shown in FIG. 20A and FIG. 20B, the behavior history information for individual users is composed to be data in which a continuous time frame in 24 hour units is set per day of the week and broad categories (refer to FIG. 3) of genre codes are enumerated as permutations on the time axis of the continuous time frame. For example, FIG. 20A shows an example of storage of the behavior history information regarding user AAA. In the drawing, although only Sunday and Monday columns are illustrated for convenience, in actuality, columns for Tuesday through Saturday are provided, wherein the behavior history information regarding user AAA is classified per day of the week and stored in the respective columns.

For example, the data of [08/Oct/2006], [Show] and [Meal], which are shown on the first line of the columns of Sunday, show that, on Oct. 8, 2006, user AAA utilized a store belonging to the broad category of [Meal] after the user utilized a store belonging to the broad category of [Show]. As a matter of course, codes of genre itself, which are [Italian food] and [Movie] may be used instead of using the broad category of [Show] and [Meal].

Now, as such behavior history information as shown in FIG. 20A and FIG. 20B is collected, it is possible to predict a behavior pattern of individual users. For example, when the behavior pattern of Sunday for user AAA is observed, it can be found that the user has a habit of having [Meal] after having seen [Show]. In other words, as the behavior of user AAA on Sunday, there is a high possibility that, where user AAA utilized a store of genre [Show], the user would subsequently utilize a store of genre [Meal]. Therefore, the succeeding genre prediction unit 210 carries out a process of predicting a genre having a high possibility to be utilized subsequently after a specified user utilized a predetermined genre, based on the behavior history information stored in the behavior history information storage unit 220.

On the other hand, the store information providing unit 130 makes use of a prediction result of such a succeeding genre and may provide store information regarding the succeeding genre following the genre related to the specified store information as additional information together with the store information responsive to a provision request by the user. In other words, where user AAA requested store information regarding [Show], the store information as requested is provided, and at the same time, store information of genre [Meal] is provided as additional information by predicting that the user will utilize a store of genre [Meal] after the user utilizes a store regarding [Show].

For example, it is assumed that user AAA requests the store information providing unit 130 to provide store information in accordance with the retrieval using a keyword [Movie Tokyo] on Sunday, and as a result thereof, the store information providing unit 130 presents a summary list of the store information matched with the taste of user AAA, wherein user AAA clicks the title portion of [Theater XXX], and the store information D1 of a store (Movie theater) being [Theater XXX] is provided. In this case, the store information providing unit 130 gives the succeeding genre prediction unit 210 an instruction of predicting a genre succeeding [Show] of user AAA for Sundays. The succeeding genre prediction unit 210 predicts it with reference to [behavior history of user AAA for Sundays] stored in the behavior history information storage unit 220 that "Genre following [Show] of user AAA for Sundays" is [Meal], and reports it to the store information providing unit 130. Therefore, the store information providing unit 130 selects store information D2 matched with the taste of user AAA, which belongs to the genre of [Meal], as additional information. To that end, store information is retrieved in the store evaluation information storage unit 120, and a store matched with the taste of user AAA may be selected among the store IDs (Content IDs) having a genre code of meal. And, upon request by user AAA, the store information D2 belonging to the genre of [Meal] selected as additional information is provided together when the store information D1 of a store being [Theater XXX] is provided.

Figure 21A:
Figure 21B:

FIG. 21A and FIG. 21B are views showing examples of a detailed provision pattern in the above-described example. In the examples, the store information D1 is first displayed, as shown in FIG. 21A, on the terminal device operated by user AAA. The store information D1 is original store information (that is, the store information matched with the keyword [Movie Tokyo]) requested by user AAA. However, as illustrated, a shift button B of a character string [Special notice] is added by the store information providing unit 130. If user AAA clicks the shift button B, the store information D2 is displayed as shown in FIG. 21B. That is, in the case of presentation pattern shown in FIG. 21A and FIG. 21B, the store information providing unit 130 transmits Web page data in which the shift button B is added to the store information D1 as requested by user AAA, and the Web page data of the store information D2 will be transmitted as additional information only when the shift button B is clicked.

Figure 22:
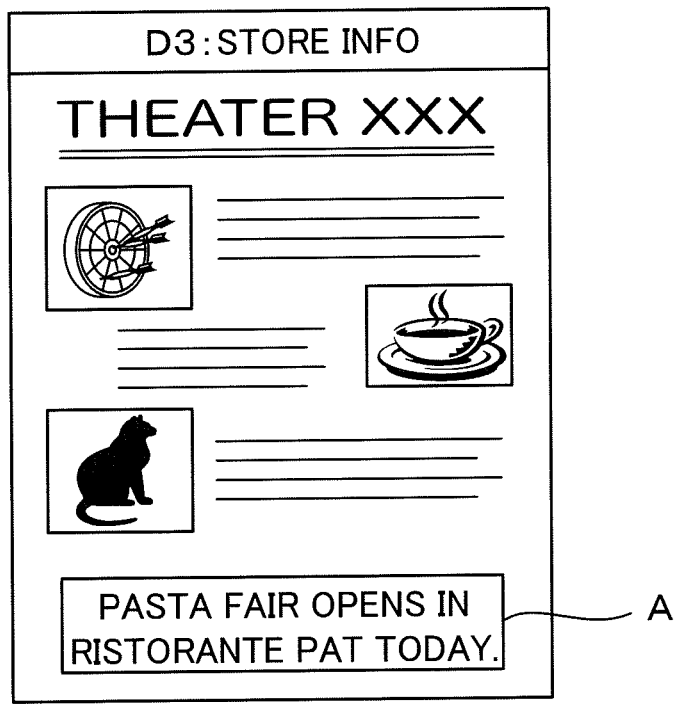
FIG. 22 is a view showing another example of the presentation pattern of additional information in the information providing system according to Embodiment 4 shown in FIG. 19.

On the other hand, FIG. 22 is a view showing an example of another provision pattern with respect to the above-described example. In this example, the store information providing unit 130 carries out a process of preparing and providing new Web page data by merging the additional information with the store information as requested by user AAA. As a result, store information D3 as illustrated will be presented. Although the store information D3 is basically the store information regarding a movie theater being [Theater XXX], additional information A of a character string being [Pasta fair opens in Ristorante PAT today.] is added as illustrated. The additional information A is extracted from a part of the store information D2 (refer to FIG. 21B) belonging to the genre of [Meal] predicted as the succeeding genre. User AAA may obtain such display as shown in FIG. 22 only by requesting the store information regarding [Movie]. This display includes the additional information A together with the store information regarding [Movie] in response to the request, wherein the additional information A composes store information related to [Meal], which user AAA is expected to execute after [Movie].

As described above, although FIG. 21A, FIG. 21B and FIG. 22 show examples of a detailed presentation pattern of the additional information, it is a matter of course that the presentation pattern of the additional information is not limited thereto, and may be subjected to various modes other than the above. For example, the display screen of a user terminal is divided into two, wherein the store information regarding [Movie] and store information (additional information) regarding [Meal] may be simultaneously displayed. Alternatively, such a mode may be adopted, in which a small window is displayed in a stacked state at a part of the screen that displays the store information regarding [Movie], and the store information (additional information) regarding [Meal] is displayed in the window.

Also, the prediction by the succeeding genre prediction unit 210 may be carried out, for example, based on some algorithms as described below. The first algorithm selects a genre for which the number of times executed immediately after a [specified genre] in the past exceeds a predetermined reference value as a [succeeding genre of the specified genre] with respect to a specified user. For example, in the case of the example shown in FIG. 20A, it is assumed that the reference value is set to 3 for each day of the week. Since the number of times of [Meal] executed immediately after [Show] for Sundays is 3, the genre [Meal] will be selected as the succeeding genre of the genre of [Show]. On the other hand, in the case of the example shown in FIG. 20B, since the number of times of [Coffee shop] executed immediately after [Show] for Sundays is 2, and the number of times of [Meal] executed immediately after [Show] is 1, no succeeding genre will be selected if the same reference value is adopted (In this case, no additional information is provided).

A prediction for which the condition is slightly slackened may be carried out. In detail, it may be sufficient that behaviors for which the number of times executed immediately after a [specified genre] in the past or executed in the course of several times thereafter becomes a predetermined reference value or more is selected as a [succeeding genre regarding the specified genre]. Here, the "executed in the course of several times thereafter" does not mean "immediately after" but means "different behaviors may intervene in the meantime." For example, the behavior history information in the order of [Shopping], [Show], [Meal] and [Coffee Shop] is stored on the fifth line of the column of Sunday in FIG. 20B. Here, [Coffee shop] does not correspond to the behavior executed immediately after [Show] (after one time). However, it corresponds to the behavior executed in the course of two times thereafter. Therefore, in the case of the example of Sunday in FIG. 20B, if a condition of "after two times" is established as "after several times," the reference value is set to 3, and a genre for which the number of times executed immediately after [specified genre] in the past or executed in the course of two times thereafter becomes 3 or more is selected as a [succeeding genre], [Coffee shop] will be selected as the [succeeding genre] since the number of times of [Coffee shop] executed immediately after [Show] or in the course of two times thereafter is 3.

As a matter of course, it does not matter that the genres selected as the [succeeding genre] may be plural. For example, where both [Meal] and [Coffee shop] are selected as the succeeding genre of [Show], both the store information regarding [Meal] and the store information regarding [Coffee shop] may be provided as additional information. If the number of additional information is excessive, the user will feel troubled. Therefore, from a practical standpoint, it is favorable that only one genre for which the number of times is most or only a few genres in the upper rank is selected as the [succeeding genre].

Also, it is possible to select the [succeeding genre] not based on the number of times executed in the past but based on the ratio executed in the past. For example, where the number of times is three for [Meal], one for [Coffee shop] and one for [Sports] as a result of counting genres executed immediately after [Show] or in the course of two times thereafter, the ratio of the genres executed immediately after [Show] or in the course of two times thereafter is 60% for [Meal], 20% for [Coffee shop] and 20% for [Sports]. Therefore, for example, if it is assumed that the genre the ratio of which is 50% or more is selected as the [succeeding genre], [Meal] will be selected as the [succeeding genre].

In actuality, it is favorable that the ratio is adopted as the reference for selection rather than the number of times is adopted as the reference for selection. This is because, while behaviors exceeding the reference value are increased if selection is executed based on the number of times in line with an increase in the sampling quantity of the behavior history information collected by the behavior history information collecting unit 230, the behaviors exceeding the reference value will not be increased if selection is executed based on the ratio.

Also, in both cases where the number of times is made into a reference and where the ratio is made into a reference, it can be commonly said that adding-up with weighting taken into consideration is enabled, by which the number of times of behaviors executed immediately after is more seriously counted than the number of times executed after two times. For example, if behaviors are added up by multiplying the number of times executed immediately after by a coefficient 2, and the number of times executed after two times by a coefficient 1, adding-up is enabled with the immediately-after executed behaviors counted with weight.

In addition, as has already been described in the examples shown in FIG. 20A and FIG. 20B, when actually predicting the [succeeding genre], it is favorable that the [succeeding genre] is predicted by recognizing the day of the week at the moment of prediction and referencing the behavior history information regarding the same day of the week as the recognized day of the week. This is because there are many cases where behavior patterns of ordinary people differ from each other per day of the week. As a matter of course, two ways of handling such as for Saturdays and Sundays and for weekdays are possible instead of handling the behavior patterns separately for each day of the week. Alternatively, such an operation is also available that holidays are handled in the same manner as Sunday.

Further, when actually predicting the [succeeding genre], it is favorable that behaviors are judged with respect to [executed immediately after or in the course of several times thereafter] in the continuous time frame set in 24 hour units. For example, although the behavior history information is stored in the order of [Show] and [Meal] on the first line of Sunday in FIG. 20A, and the behavior history information is stored in the order of [Coffee shop], [Show] and [Meal] on the second line thereof, the behavior order taken into consideration in predicting the [succeeding genre] is completed in each line (that is, in the continuous time frame set in 24 hour units), and the order beyond the line is not taken into consideration. That is, a behavior pattern of having executed [Meal] immediately after [Show] can be recognized from the information on the first line, and a behavior pattern of having executed [Show] immediately after [Coffee shop] or having executed [Meal] immediately after [Show] can be recognized from the information on the second line. However, it is not appropriate to recognize a behavior pattern of having executed [Coffee shop] immediately after [Meal] based on the before-after relationship in time between [Meal] existing last in the first line and [Coffee shop] existing at the top of the second line. This is because the behavior patterns of ordinary people should be usually grasped by the unit of a day.

<<<Section 9. Other Modified Versions>>>

Finally, a description is given of other modified versions of the present invention.

(1) Modified Version in which Genre Sorting is not Executed

Since, in the respective embodiments, genre codes are included in the store evaluation information E and the user taste information T in order to divide individual stores (Web content data) into some genres and handle the same, comparison of both is carried out with respect to the same genre codes. However, when carrying out the present invention, excepting Embodiment 4 described in Section 8, genre sorting of stores is not necessarily required and it is not requisite to use the genre codes. For example, where the system is operated to provide only the store information of restaurants, it is not necessary to execute sorting by genres since all the store information to be handled belongs to the genre of restaurants. As a matter of course, in this case, it is meaningful to minutely classify the restaurants into [Japanese food], [French food], and [Italian food], etc.

(2) Modified Version for Presenting Evaluation Values

FIG. 2(*a*) through FIG. 2(*i*) show display examples of store information of various types of stores. The store evaluation information of the respective stores is prepared in the store evaluation information storage unit 120, and evaluation values regarding predetermined feature items are preserved for each of the stores. Therefore, it is convenient if the store information providing unit 130 is devised so as to provide the evaluation values included in the store evaluation information with respect to the stores regarding the store information together when providing this store information. If so, since a user can grasp respective evaluation values shown in FIG. 4(*a*) through FIG. 4(*i*) along with the store information shown in FIG. 2(*a*) through FIG. 2(*i*), the evaluation values can be utilized for reference when selecting a store.

(3) Combination of Embodiments 1 Through 4

Although a description was given of Embodiments 2 through 4 as the system to which new features are added to the system according to Embodiment 1 that becomes the base, it is possible to utilize the systems according to Embodiments 1 through 4 in any combination thereof. For example, a system in which Embodiments 1 and 3 are combined and a system in which all of Embodiments 1 through 4 are combined are achievable.

(4) Retrieval Condition Utilized for Selection by the Store Information Providing Unit The store information providing unit 130 of the information providing system according to the present invention achieves a function of selecting store information matched with a retrieval condition and suitable for a user when it receives a provision request of the store information with a specified retrieval condition from the user. That is, the store information providing unit 130 selects a number of sets of store information stored in the store information storage unit 100 by applying two types of sieves. The first sieve relates to selection based on the reference of "being matched with a specified retrieval condition," and the second sieve relates to selection based on the reference of "being suitable for a user." Here, as already described above, the second sieve is carried out based on comparison between the user taste information T and the store evaluation information E.

In the embodiments described before, with respect to a [specified retrieval condition] that becomes a reference of the first sieve, an example was shown in which a condition of "being matched with the keywords entered by a user himself/herself" is established. For example, when a user requests store information by entering the keywords of [Italian], [Restaurant] and [Tokyo], the store information related to these keywords is selected by the first sieve. However, a [specified retrieval condition] that becomes a reference of the first sieve in the information providing system according to the present invention is not limited to the condition of "being matched with the keywords entered by the user himself/herself," but various conditions may be established other than the same.

For example, a condition of "being matched with the genre entered by the user himself/herself" may be set to the retrieval condition. In this case, the user may enter designation of a genre such as [Italian food] or [Women's clothing] when the user requests for providing the store information. In this case, the store information providing unit 130 will carry out retrieval not based on the keywords but based on the genre code. As a matter of course, genres based on the broad category, such as [Meal], [Coffee shop] and [Shopping], may be designated as the retrieval conditions.

In addition, it is not necessary to cause a user himself/herself to enter the [specified retrieval condition]. For example, if the [present position] of a user is established as a retrieval condition, the reference of the first sieve will become [store information matched with the present position of the user]. In this case, since the [present position of the user (for example, latitude and longitude)] may be automatically recognized by various methods, it is not necessary for the user himself/herself to enter the same. A method for causing a user to report the fact of having utilized a store, a method for recognizing the position of a portable terminal device with a GPS function, and a method for recognizing that communications are made between a store installation unit and a portable terminal device that the user carries, etc., may be used as a method for causing the system to recognize the [present position of the user]. Accordingly, if the [present position of a user] is established as the retrieval condition, the store information providing unit 130 automatically recognizes the present position of individual users by the above-described method, wherein it becomes possible to select the store information matched with the present position with respect to the respective users. For example, where store information is provided to a user who is recognized to be in [Tokyo], the store information of stores located in the district of [Tokyo] may be selected by the first sieving process.

As a matter of course, it is possible to combine and utilize a retrieval condition of keywords and genres and a retrieval condition of the present position. For example, if the present position of a user who requests to receive store information by entering keywords of [Italian] and [Restaurant] is recognized to be [Tokyo], the store information of Italian restaurants located in the district of [Tokyo] may be selected in the first sieving process.

When a [schedule of a user] is established as a retrieval condition, the [store information matched with the schedule of the user] may be selected in the first sieving process. In this case, the user is caused to register his/her own behavior schedule in the store information providing unit 130 (or a server device outside the system of the present invention) in advance. For example, a personal calendar in which a schedule is entered and which can be browsed is provided in a user terminal in the format of a Web page, and individual users are caused to register a monthly schedule. If so, since the store information providing unit 130 can recognize when and what type of a behavior which the user plans by referencing the registration content, the first sieving process can be carried out by using the schedule as the retrieval condition.

For example, it is assumed that a plan of "meal for wedding anniversary at 6:00 p.m., Nov. 20, 2006" is registered as a schedule of a specified user. In this case, if the user requests the store information on "Nov. 20, 2006," the store information regarding restaurants may be selected in the first sieving process using the schedule of "meal for wedding anniversary" as a retrieval condition. For example, retrieval may be carried out using [Wedding anniversary] AND [Meal] as the keywords. As a matter of course, not only the date of [Nov. 20, 2006] but also the time may be taken into consideration. For example, if the store information regarding the schedule established within 6 hours from the time of request by a user is selected in the first sieving process, when a request is issued from "the noon to 6:00 p.m. on Nov. 20, 2006" in the above-described example, store information is retrieved using the keywords of [Wedding anniversary] AND [Meal]. If there is a user who establishes a schedule per day of the week, such like [Eat-out on every Friday], and he/she requests store information on Friday, the store information regarding restaurants may be selected in the first sieving process. On the other hand, in the case of a user who establishes a schedule for each time period, such like [Eat-out for lunch from the noon, everyday], if it is set that a schedule established within one hour from the present time is referenced, the store information regarding restaurants may be selected in the first sieving process when a user requests [from 11:00 a.m. to the noon]. Thus, the first sieving process may be carried out based on the date, time and day of the week at the time when a user requests store information.

(5) Recognition of Accompanying Persons

In Section 8, a description was given of a method for collecting daily behavior patterns for individual users and predicting a succeeding genre expected to be executed after a behavior pertaining to a certain genre based on the result of collection. That is, as shown in FIG. 19, behavior history information showing [when, which genre of store, who utilized] is collected by the behavior history information collecting unit 230 and is stored in the behavior history information storage unit 220. And, where a specified user behaved regarding one genre, the succeeding genre predicting unit 210 carries out a process of predicting which genre of behavior the user takes next has a high possibility, based on the behavior history information.

Although the succeeding genre prediction is under the premise that the [succeeding genre] is predicted by referencing the past behavior patterns of individual users, it is common that even the same user takes a different behavior pattern if the accompanying person differs. For example, there are many cases where the behavior patterns of the same user differ from each other with respect to behavior pattern when going out with a fiancé or a fiancee, behavior pattern when going out with a fellow worker, and behavior pattern when going out with a classmate of a university.

Accordingly, if behavior history information showing [when, with whom, which genre of store, who utilized] is collected by the behavior history information collecting unit 230 and is stored in the behavior history information storage unit 220, the succeeding genre prediction unit 210 may predict the succeeding genre with the accompanying person taken into consideration. For example, the behavior history information shown in FIG. 20A shows the behavior patterns with respect to user AAA. However, if the [behavior history information when accompanying BBB] in the case where user AAA accompanies BBB and the [behavior history information when accompanying CCC] in the case where user AAA accompanies CCC are separately collected, the succeeding genre can be predicted based on the [behavior history information when accompanying BBB] if it can be recognized that user AAA goes out, accompanying BBB, wherein a more appropriate prediction will be enabled.

In order to carry out such a prediction with the accompanying person taken into consideration, it is necessary not only to grasp the behaviors of individual users but also to recognize the accompanying person for the behavior. As a detailed method for causing the behavior history information collecting unit 230 to collect behavior history information including information of the accompanying person, "method of self-declaration of respective members" is the simplest method. When causing respective members to make a self-declaration, the behavior history information is caused to have information of [with whom], which shows an accompanying person. Alternatively, the above-described "method by which the schedule is entered in advance" may be used. In this case, when entering the schedule, the schedule is caused to include information of [with whom].

Also, if it is devised that, if an accompanying person carries a cellular phone with a GPS function, the position information recognized by the GPS is periodically automatically reported from the cellular phone to the present system, it becomes possible to obtain the position information of the accompanying person, wherein it becomes possible to recognize that the person existing at the same position as that of the user is an accompanying person. Alternatively, information of accompanying persons can be collected by the store installation unit. For example, if the entrance/exit gate apparatus of the facility is used, it is possible to obtain information with respect to not only the user but also the accompanying persons, and it becomes possible to recognize the accompanying persons by reporting from the entrance/exit gate apparatus. When a communication apparatus for providing store coupons or service tickets in a form of electronic data is disposed in a store facility such as a restaurant, etc., if a portable terminal device that the accompanying person carries is caused to pick up the electronic data, and information specifying a store included in the electronic data and an identification code of the accompanying person are automatically reported from the portable terminal device or the communication apparatus to the present system, it is possible to recognize the accompanying person as a person existing in the same store as that of the user. Also, a case where a portable terminal device that an accompanying person carries is caused to pick up electronic data including information to specify a store from a two-dimensional code printed on a medium such as a handbill placed in a facility is the same as the above.

As another method, there is a method for utilizing a communication function between portable terminal devices that individual users carry. Portable terminal devices in recent use are provided with a function of executing communications with other separate portable terminal devices by utilizing infrared rays, Bluetooth (registered trademark), and wireless LAN, etc. Therefore, if it is possible to execute direct communications by utilizing the above-mentioned communication function (a communication function of any type may be acceptable if information is directly transmitted and received between terminals) between a portable terminal device that the user carries and a portable terminal device that an accompanying person carries, information to specify the accompanying person can be obtained via the direction communications. For example, if the portable terminal devices are of a type that utilizes an infrared ray communication function, both the portable terminal devices are faced to each other, and predetermined communication operation is carried out, wherein the identification code to specify the accompanying person, which is stored in the portable terminal device of the accompanying person, can be taken in the portable terminal device of the user. Therefore, when transmitting behavior history information from the portable terminal device of the user to the behavior history information collecting unit 230 by various methods described above, it becomes possible to transmit information including the identification code to specify the accompanying person.

Further, where an omnidirectional communication function of Bluetooth (registered trademark) and wireless LAN, etc., can be utilized, an identification code to specify an accompanying person can be obtained without any intended communication operation by the user. For example, if both portable terminal devices are caused to have a function of searching for other portable terminal devices existing in the neighborhood and executing communications at a predetermined cycle (for example, 5-minute interval), the identification code of the counterpart user can always be obtained from a portable terminal device existing in the neighborhood without any intended communication operation, wherein it is possible to update the information to the newest one which shows "with whom the user is at present."

Further, these methods can be combined with the above-described "method by which the schedule is entered in advance." That is, where a schedule including the identification code of an accompanying person (the schedule which specifies with whom a behavior is carried out) is registered in advance, it is possible to execute automatic judgment whether the behavior related to the schedule has been actually carried out or not, by checking that the "accompanying person identification code actually picked up in a store" is coincident with the "accompanying person identification code in the registered schedule."

Various methods for recognizing the accompanying person, which have been described above, may be applicable to Embodiment 3 described in Section 7. In Embodiment 3, where a certain plan for user AAA to utilize any store together with the accompanying person BBB is established, if a request is given to obtain store information under the group utilization condition of [users AAA and BBB], the store information will be selected with the user taste information for both the users AAA and BBB taken into consideration. Therefore, where user AAA requests the store information, if it can be automatically recognized by various methods described above that the accompanying person of user AAA is user BBB, the store information for which the user taste information for both users AAA and BBB is taken into consideration may be selected without positively transmitting any information of [the accompanying person being BBB] to the store information providing unit 130 by user AAA.

INDUSTRIAL APPLICABILITY

The present invention is applicable to providing store information regarding various stores utilizing the Internet.

The invention claimed is:

1. An information providing system implemented on a computer having a processor and a memory coupled to said processor, comprising:
   a store information storage unit in which store information regarding individual stores is stored;
   a store evaluation information storage unit in which store evaluation information (E) for the respective stores is stored, said store evaluation information (E) includes store IDs to specify the respective stores and evaluation values of the respective stores with respect to specified feature items defined in advance;
   a user taste information storage unit in which user taste information (T) for various users is stored, said user taste information (T) includes user IDs to specify the respective users and taste values of the respective users with respect to said feature items; and
   a store information providing unit for providing store information when a provision request of store information coincident with a specified retrieval condition is received from a user, said store information providing unit selecting store information coincident with the retrieval condition and suitable for the user, by comparing user taste information (T) of the user stored in the user taste information storage unit with store evaluation information (E) with respect to various stores which is stored in the store evaluation information storage unit, extracting the selected store information from the store information storage unit, and providing the extracted store information to a terminal device of the user, wherein at least some of said units use said processor:

a personal satisfaction information recording unit for, when a plurality of users utilize a specified store as a group, accumulating and recording personal satisfaction information including group composition information to specify users who compose the group, user IDs to specify individual users, and personal satisfaction degrees of the users; and a satisfaction degree ratio calculating unit for calculating a satisfaction degree ratio of respective users under a specified group utilization condition of a specified group that utilizes a store based on all or a part of the personal satisfaction information recorded in the personal satisfaction information recording unit;

wherein the store information providing unit, when receiving a provision request of store information under the specified group utilization condition, extracts store information suitable for individual users pertaining to the specified group utilization condition, respectively, as candidates and selects and provides store information among the candidates in compliance with the satisfaction degree ratio under the specified group utilization condition.

2. The information providing system according to claim 1, further comprising:

a voting result recording unit for accumulating and recording a voting result when a user votes a personal evaluation value with respect to feature items of a store; and an evaluation value updating unit for extracting all or a part of the voting results recorded in the voting result recording unit for a specified store and updating evaluation values of store evaluation information (E) for the specified store, which is stored in the store evaluation information storage unit, based on the extracted voting results.

3. An information providing system implemented on a computer having a processor and a memory coupled to said processor, comprising:

a store information storage unit in which store information regarding individual stores is stored;

a store evaluation information storage unit in which store evaluation information (E) for the respective stores is stored, said store evaluation information (E) includes store IDs to specify the respective stores, genre codes showing genres of the respective stores, and evaluation values of the respective stores with respect to specified feature items defined in advance;

a user taste information storage unit in which user taste information (T) for various users is stored, said user taste information (T) includes user IDs to specify the respective users, the genre codes, and taste values of the respective users with respect to said feature items corresponding to the genre codes; and a store information providing unit for providing store information when a provision request of store information coincident with a specified retrieval condition is received from a user, said store information providing unit selecting store information coincident with the retrieval condition and suitable for the user, by comparing user taste information (T) of the user stored in the user taste information storage unit with store evaluation information (E) which is stored in the store evaluation information storage unit both including a same genre code, extracting the selected store information from the store information storage unit, and providing the extracted store information to a terminal device of the user, wherein at least some of said units use said processor;

a personal satisfaction information recording unit for, when a plurality of users utilize a specified store as a group, accumulating and recording personal satisfaction information including group composition information to specify users who compose the group, the genre of a store utilized by the group, user IDs to specify individual users, and personal satisfaction degrees of the users; and a satisfaction degree ratio calculating unit for calculating a satisfaction degree ratio of respective users under a specified group utilization condition of a specified group that utilizes a specified genre of store based on the personal satisfaction information recorded in the personal satisfaction information recording unit;

wherein the store information providing unit, when receiving a provision request of store information under the specified group utilization condition, extracts store information suitable for individual users pertaining to the specified group utilization condition, respectively, as candidates and selects and provides store information among the candidates in compliance with the satisfaction degree ratio under the specified group utilization condition.

4. The information providing system according to claim 3, further comprising:

a voting result recording unit for accumulating and recording a voting result for each individual store when a user votes a personal evaluation value with respect to feature items of a store; and an evaluation value updating unit for extracting all or a part of the voting results recorded in the voting result recording unit for a specified store and updating evaluation values of store evaluation information (E) for the specified store, which is stored in the store evaluation information storage unit, based on the extracted voting results.

5. The information providing system according to claim 3, further comprising:

a behavior history information collecting unit for collecting behavior history information when a specified user utilizes a specified store, said behavior history information including a user ID of the specified user, a genre code of the specified store, and utilization time;

a behavior history information storage unit for storing the behavior history information thus collected; and a succeeding genre prediction unit for predicting a genre having a high possibility to be utilized subsequently after the specified user utilized a certain genre, based on the behavior history information;

wherein the store information providing unit provides additional information along with main store information responsive to a provision request from the specified user, said additional information being store information pertaining to a succeeding genre which succeeds to a genre of said main store information and is obtained by utilizing a prediction result of the succeeding genre prediction unit.

6. The information providing system according to claim 1, wherein the store information providing unit has a function of transmitting Web content data to terminal devices operated by users via the Internet, store information is stored in the store information storage unit as Web content data, and a content ID to specify the Web content data is utilized as the store ID.

7. The information providing system according to claim 1, wherein
the store evaluation information storage unit stores store evaluation information (E) including evaluation values for a plurality N of feature items, respectively, and
the user taste information storage unit stores user taste information (T) including taste values for a plurality N of feature items, respectively,
wherein when the store information providing unit receives a provision request of store information from a user, the store information providing unit compares a taste vector obtained by placing the taste values for respective N feature items included in the user taste information (T) of the user in respective coordinate axes of an N-dimensional coordinate system with an evaluation vector obtained by placing the evaluation values for respective N feature items included in the store evaluation information (E) of respective stores in respective coordinate axes of the N-dimensional coordinate system and selects store information based on a degree of approximation of both vectors.

8. The information providing system according to claim 1, wherein the store information providing unit also provides evaluation values included in the store evaluation information (E) for a store with respect to store information when providing said store information.

9. The information providing system according to claim 2, wherein
the voting result recording unit concurrently records recording time information when it records a voting result, and
the evaluation value updating unit updates evaluation values of store evaluation information by extracting only those, the recording time of which is within a predetermined period, among the voting results recorded in the voting result recording unit.

10. The information providing system according to claim 2, wherein the evaluation value updating unit carries out updating in which the average values of the personal evaluation values included in the extracted voting results are made into new evaluation values of store evaluation information.

11. The information providing system according to claim 1, wherein
the personal satisfaction information recording unit concurrently records recording time information when it records personal satisfaction information, and
the satisfaction degree ratio calculating unit calculates a satisfaction degree ratio by utilizing only those, the recording time of which is within a predetermined period, among personal satisfaction information recorded in the personal satisfaction information recording unit.

12. The information providing system according to claim 1,
wherein the satisfaction degree ratio calculating unit calculates, as a satisfaction degree ratio, a ratio of average values of personal satisfaction degrees for individual users included in the personal satisfaction information utilized for calculation.

13. The information providing system according to claim 1,
wherein the store information providing unit selects sets of store information among candidates of store information extracted for individual users at a probability responsive to a direct ratio of satisfaction degrees of individual users or at a probability responsive to an inverse ratio of the satisfaction degrees of individual users.

14. The information providing system according to claim 1, further comprising:
a target store recording unit for, when a specified user has interest in a specified store, accumulating and recording, as a target store ID, a store ID of the specified store for the specified user; and
a taste value updating unit for extracting, as updating store IDs, all or a part of target store IDs recorded in the target store recording unit for the specified user, extracting the store evaluation information (E) including the updating store IDs from the store evaluation information storage unit as updating store evaluation information, and updating taste values of the user taste information (T) for the specified user, which is stored in the user taste information storage unit, based on evaluation values of the updating store evaluation information.

15. The information providing system according to claim 3, further comprising:
a target store recording unit for, when a specified user has interest in a specified store, accumulating and recording, as a target store ID, a store ID of the specified store for the specified user and for each individual genre; and
a taste value updating unit for extracting, as updating store IDs, target store IDs of all or a part of a predetermined genre which becomes an object to be updated recorded in the target store recording unit for the specified user, extracting the store evaluation information (E) including the updating store IDs from the store evaluation information storage unit as updating store evaluation information, and updating taste values of the user taste information (T) for the specified user regarding said genre to be updated, which is stored in the user taste information storage unit, based on evaluation values of the updating store evaluation information.

16. The information providing system according to claim 14,
selecting a plurality of sets of store information coincident with a retrieval condition and suitable for a user and providing a list in which only summaries of respective selected store information is enumerated, and a second providing step for providing all the content of a set of store information of a store designated by the user on the list.

17. The information providing system according to claim 16,
wherein when the store information providing unit executes the second providing step based on designation by a user, the target store recording unit accumulates and records a store ID of a store a set of store information of which has been provided by the second providing step, as a target store ID for the user.

18. The information providing system according to claim 14,
wherein the target store recording unit accumulates and records a store ID of a specified store as a target store ID for a user when the target store recording unit receives a report that the user has interest in the specified store or a report that the specified user has utilized the specified store.

19. The information providing system according to claim 14, wherein
the store information providing unit has a function of providing store information to a portable terminal device that a user carries, and
the target store recording unit accumulates and records a store ID of a specified store as a target store ID for a user where it is detected based on information from a position recognition device having a function of recognizing a position of the portable terminal device that the user is located in the specified store.

20. The information providing system according to claim 14, wherein
the store information providing unit has a function for providing store information to a portable terminal device that a user carries, and
where communications have been executed between a store installation unit installed in a predetermined store and the portable terminal device, the target store recording unit accumulates and records a store ID of the store as a target store ID for the user upon receiving a notice from the store installation unit or the portable terminal device.

21. The information providing system according to claim 14, wherein
the target store recording unit concurrently records recording time information when it records a target store ID, and
the taste value updating unit extracts only those, the recording time of which is within a predetermined period, as updating store IDs among the target store IDs recorded in the target store recording unit.

22. The information providing system according to claim 14,
wherein the taste value updating unit carries out updating in which an average value of the evaluation values of the updating store evaluation information are made into a new taste value of user taste information.

* * * * *